US012704002B1

(12) United States Patent
Liang et al.

(10) Patent No.: US 12,704,002 B1
(45) Date of Patent: Aug. 11, 2026

(54) MULTI-POINT LOCKING SYSTEM FOR PATIO DOORS, FRENCH DOORS/WINDOWS, LARGE CASEMENT WINDOWS, AND THE LIKE

(71) Applicant: Vision Industries Group, Inc., Somerset, NJ (US)

(72) Inventors: Luke Liang, Somerset, NJ (US); Glen Paesano, Point Pleasant Beach, NJ (US); Sachin Khatri, Kendall Park, NJ (US)

(73) Assignee: Vision Industries Group, Inc., Somerset, NJ (US)

( * ) Notice: Subject to any disclaimer, the term of this patent is extended or adjusted under 35 U.S.C. 154(b) by 183 days.

(21) Appl. No.: 18/598,019

(22) Filed: Mar. 7, 2024

Related U.S. Application Data

(60) Provisional application No. 63/617,120, filed on Jan. 3, 2024.

(51) Int. Cl.
*E05B 65/08* (2006.01)
*E05B 63/00* (2006.01)

(52) U.S. Cl.
CPC ........ *E05B 65/087* (2013.01); *E05B 63/0052* (2013.01); *E05Y 2201/11* (2013.01); *E05Y 2900/132* (2013.01)

(58) Field of Classification Search
CPC ............... E05B 65/087; E05B 65/0876; E05B 65/0882; E05B 65/0888; E05B 63/0052;
(Continued)

(56) References Cited

U.S. PATENT DOCUMENTS 16,228 A 12/1856 Copeland
30,408 A 10/1860 Judd
(Continued)

FOREIGN PATENT DOCUMENTS

GB 2 286 627 8/1995
GB 2 461 079 12/2009
(Continued)

OTHER PUBLICATIONS

Press Fit Forces Stress Design Calculator, Jun. 18, 2018, available at: www.engineersedge.com/calculators/machine-design/press-fit/press-fit.htm.
(Continued)

*Primary Examiner* — Christine M Mills
*Assistant Examiner* — Faria F Ahmad
(74) *Attorney, Agent, or Firm* — Thomas A. O'Rourke; James Bongiorno; O'Rourke IP Law PLLC

(57) ABSTRACT

A lock incudes: a housing, cover, first and second locking members, a rocker arm and driving member. First and a second flanges on each of the housing and cover form respective tracks that are aligned. Flanges of the first and second locking members slide in first and second portions of the tracks in the housing and cover. A rocker arm couples sliding movement of the first and second locking members together. A driving member is pivotally mounted to the housing, and when rotated from a first to a second rotation position, its cam drives a first cam following surface on the first locking member causing it to slide, and thus causing the second locking member to oppositely slide, thereby aligning oversized openings of the locking members with respective lock pins of the keeper, to unlock the lock system and permit the patio door to slide into a door open position.

8 Claims, 21 Drawing Sheets

(58) Field of Classification Search
CPC ... E05C 1/004; E05C 1/08; E05C 7/04; E05C 7/045; E05C 7/06; E05C 9/04; E05C 9/047; E05C 9/048; E05C 9/008; E05C 1/002
See application file for complete search history.

(56) References Cited

U.S. PATENT DOCUMENTS

| | | | | |
|---|---|---|---|---|
| 36,524 | A | 9/1862 | Minor | |
| 51,222 | A | 11/1865 | Ridell | |
| 108,778 | A | 11/1870 | Gorman | |
| 115,781 | A | 6/1871 | Steele | |
| 126,872 | A | 5/1872 | Buckman | |
| 148,857 | A | 3/1874 | Smith | |
| 163,008 | A | 5/1875 | Gillespie | |
| 166,842 | A | 8/1875 | Berryman | |
| 178,360 | A | 6/1876 | Cooper | |
| 190,074 | A | 4/1877 | Penfield | |
| 192,614 | A | 7/1877 | Andrews | |
| 192,919 | A | 7/1877 | Hoyt | |
| 201,146 | A | 3/1878 | Adler | |
| 226,033 | A | 3/1880 | Burns | |
| 230,476 | A | 7/1880 | Green | |
| 234,387 | A | 11/1880 | Burgess | |
| 284,993 | A | 9/1883 | Abele | |
| 314,350 | A | 3/1885 | Smith | |
| 316,285 | A | 4/1885 | McKeen | |
| 331,005 | A | 11/1885 | Sahr | |
| 336,302 | A | 2/1886 | Dudgeon | |
| 346,788 | A * | 8/1886 | Teufel | E05B 63/0052 292/161 |
| 350,678 | A | 10/1886 | Hussey | |
| 353,287 | A | 11/1886 | Chumard | |
| 368,595 | A | 8/1887 | King | |
| 369,885 | A | 9/1887 | Shaw | |
| 375,656 | A | 12/1887 | Shaw | |
| 376,252 | A | 1/1888 | McIntyre | |
| 379,910 | A | 3/1888 | Rosentreter | |
| 410,728 | A | 9/1889 | Brown | |
| 417,868 | A | 12/1889 | Janes | |
| 423,761 | A | 3/1890 | Hasenpflug | |
| 426,303 | A | 4/1890 | McGovern | |
| 447,068 | A | 2/1891 | Dixon | |
| 452,723 | A | 5/1891 | Schmalhausen | |
| 471,363 | A | 3/1892 | Sloan | |
| 480,148 | A | 8/1892 | Theby | |
| 493,159 | A | 3/1893 | Gibson | |
| 509,941 | A | 12/1893 | Perry | |
| 512,593 | A | 1/1894 | Webster | |
| 520,754 | A | 5/1894 | Burmeister | |
| 526,118 | A | 9/1894 | Sharp | |
| 528,656 | A | 11/1894 | Burmeister | |
| 530,078 | A | 12/1894 | Ammerman | |
| 532,935 | A | 1/1895 | Woolery | |
| 534,185 | A | 2/1895 | Winchester | |
| 537,258 | A | 4/1895 | Wilcox | |
| 539,030 | A | 5/1895 | Bitner | |
| 551,181 | A | 12/1895 | Dillon | |
| 551,242 | A | 12/1895 | Wallace | |
| 554,448 | A | 2/1896 | Keil | |
| 564,426 | A | 7/1896 | Hubbard | |
| 572,591 | A | 12/1896 | Woodard | |
| 587,424 | A | 8/1897 | Bonin | |
| 590,225 | A | 9/1897 | Hill | |
| 653,458 | A | 7/1900 | Paquette | |
| 666,596 | A | 1/1901 | Breen | |
| 683,928 | A | 10/1901 | Geraghty | |
| 688,491 | A | 12/1901 | Sigler | |
| 695,736 | A | 3/1902 | Kendrick | |
| 698,742 | A | 4/1902 | Scharnweber | |
| 699,696 | A | 5/1902 | Mellen | |
| 708,406 | A | 9/1902 | Robison | |
| 714,343 | A | 11/1902 | Wellman | |
| 718,007 | A | 1/1903 | Linn | |
| 719,981 | A | 2/1903 | Adams | |
| 722,162 | A | 3/1903 | St. Louis | |
| 724,466 | A | 4/1903 | Hannan | |
| 743,716 | A | 11/1903 | Hadka | |
| 744,755 | A | 11/1903 | Hasenpflug | |
| 745,888 | A | 12/1903 | McElwee | |
| 749,469 | A | 1/1904 | Assorati | |
| 756,453 | A | 4/1904 | Arens | |
| 756,559 | A | 4/1904 | Arens | |
| 757,249 | A | 4/1904 | Barnard | |
| 759,642 | A | 5/1904 | Sparks | |
| 764,493 | A | 7/1904 | Noseworthy | |
| 769,386 | A | 9/1904 | Johnson | |
| 769,767 | A | 9/1904 | Phelps | |
| 774,536 | A | 11/1904 | Saunders | |
| 775,602 | A | 11/1904 | Hearnshaw | |
| 800,043 | A | 9/1905 | Witte | |
| 804,994 | A | 11/1905 | Andrews | |
| 815,537 | A | 3/1906 | Kissinger | |
| 833,900 | A | 10/1906 | Sigler | |
| 837,811 | A | 12/1906 | Ebbeson | |
| 840,427 | A | 1/1907 | Brister | |
| 865,090 | A | 9/1907 | Eddy | |
| 866,073 | A | 9/1907 | Saunders | |
| 878,206 | A | 2/1908 | Johnson | |
| 881,658 | A | 3/1908 | Bowman | |
| 886,108 | A | 4/1908 | Allen | |
| 887,690 | A | 5/1908 | Pearce | |
| 897,719 | A | 9/1908 | Daubaignan | |
| 900,079 | A | 10/1908 | Bittorf | |
| 910,850 | A | 1/1909 | Petrie | |
| 913,730 | A | 3/1909 | Kapus | |
| 922,894 | A | 5/1909 | Heid | |
| 926,899 | A | 7/1909 | Roy | |
| 928,408 | A | 7/1909 | Taube | |
| 948,628 | A | 2/1910 | Jefferis | |
| 959,150 | A | 5/1910 | Morris | |
| 963,983 | A | 7/1910 | Bernhard | |
| 966,063 | A | 8/1910 | Toothaker | |
| 976,777 | A | 11/1910 | Brown | |
| 980,131 | A | 12/1910 | Shean | |
| 998,642 | A | 7/1911 | Shean | |
| 1,003,386 | A | 9/1911 | Welker | |
| 1,006,211 | A | 10/1911 | Hermon | |
| 1,020,454 | A | 3/1912 | Seidenbecker | |
| 1,023,766 | A * | 4/1912 | Sinclair | E05B 65/0007 292/DIG. 21 |
| 1,041,803 | A | 10/1912 | Kilburn | |
| 1,051,918 | A | 2/1913 | Rowley | |
| 1,059,999 | A | 4/1913 | James | |
| 1,069,079 | A | 7/1913 | Voight | |
| 1,077,487 | A | 11/1913 | Miller | |
| 1,080,172 | A | 12/1913 | Rusk | |
| 1,100,820 | A | 6/1914 | Edwards | |
| 1,121,228 | A | 12/1914 | Burkhart | |
| 1,122,026 | A | 12/1914 | O'Rourke | |
| 1,127,835 | A | 2/1915 | Westlund | |
| 1,133,217 | A | 3/1915 | Barton | |
| 1,141,437 | A | 6/1915 | Unterlender | |
| 1,148,712 | A | 8/1915 | Overland | |
| 1,163,086 | A | 12/1915 | Harper | |
| 1,173,129 | A | 2/1916 | Taliaferro | |
| 1,177,637 | A | 4/1916 | Lane | |
| 1,177,838 | A | 4/1916 | Wilkinson | |
| 1,207,989 | A | 12/1916 | O'Rourke | |
| 1,232,683 | A | 7/1917 | Holllis | |
| 1,243,115 | A | 10/1917 | Shur | |
| 1,244,725 | A | 10/1917 | Gadke | |
| 1,253,810 | A | 1/1918 | Gianninoto | |
| 1,261,274 | A | 4/1918 | Newsam | |
| 1,269,467 | A | 6/1918 | Winters | |
| 1,270,740 | A | 6/1918 | Keyes | |
| 1,272,900 | A | 7/1918 | Berman | |
| 1,279,353 | A | 9/1918 | Kelley | |
| 1,311,052 | A | 7/1919 | Danforth | |
| 1,322,677 | A | 11/1919 | Ditlefsen | |
| 1,338,250 | A | 4/1920 | Parkes | |
| 1,338,416 | A | 4/1920 | Bellinger | |
| 1,339,362 | A | 5/1920 | L'Heureux | |
| 1,341,234 | A | 5/1920 | Horton | |

(56) References Cited

U.S. PATENT DOCUMENTS 1,350,698 A 8/1920 Boedtcher
1,366,909 A * 2/1921 Frommer ............ E05B 37/0037 70/70
1,387,302 A 8/1921 Page
1,388,272 A 8/1921 Lawrence
1,393,628 A 10/1921 Leichter
1,398,174 A 11/1921 Carlson
1,399,897 A 12/1921 Singer
1,412,154 A 4/1922 Wollesen
1,438,547 A * 12/1922 O'Connor ................. E05C 9/02 217/65
1,439,585 A 12/1922 Trost
1,461,467 A 7/1923 Stuart
1,463,866 A 8/1923 Bourbeau
1,470,858 A 10/1923 Maxwell
1,485,382 A 3/1924 Foley
1,490,874 A 4/1924 Webb
1,516,995 A 11/1924 Trigueiro
1,550,532 A 8/1925 French
1,552,690 A 9/1925 Frantz
1,587,037 A 6/1926 Rudolph
1,601,051 A 9/1926 Wilbert
1,605,717 A 11/1926 Gregg
1,619,031 A 3/1927 Ostrosky
1,622,742 A 3/1927 Shipman
1,656,818 A 1/1928 Dillon
1,692,579 A 11/1928 Schrader
1,704,946 A 3/1929 Lindgren
1,712,792 A 5/1929 Hansen
1,715,957 A 6/1929 Stein
1,724,637 A 8/1929 Bergstrom
1,750,715 A 3/1930 Jeffers
1,794,171 A 2/1931 Grutel
1,812,288 A 6/1931 Drapeau
1,819,824 A 8/1931 McAllister
1,864,253 A 6/1932 McIntyre
1,869,274 A 7/1932 Phillips
1,877,177 A 9/1932 Hinderer
1,891,940 A 12/1932 McAllister
1,900,936 A 3/1933 Huttger
1,901,974 A 3/1933 Macy
1,918,114 A 7/1933 Lorenzen
1,922,062 A 8/1933 Sullivan
1,940,084 A 12/1933 Grasso
1,960,034 A 5/1934 Stewart
1,964,114 A 6/1934 Gerlach
2,095,057 A 10/1937 Corrado
2,122,661 A 7/1938 Rightmyer
2,126,995 A 8/1938 Kingdon
2,136,408 A 11/1938 Bedell
2,158,260 A 5/1939 Stillman
2,202,561 A 5/1940 Lahiere
2,232,965 A 2/1941 Perl
2,272,145 A 2/1942 Anderson
2,326,084 A 8/1943 Westrope
2,369,584 A 2/1945 Lundholm
2,406,459 A * 8/1946 Gibson ..................... E05C 9/04 292/39
2,452,521 A 10/1948 Johnson
2,480,016 A 8/1949 Granberg
2,480,988 A 9/1949 Walton
2,498,508 A * 2/1950 Rudolph ............... E05B 65/025 292/49
2,500,349 A 3/1950 Menns
2,503,370 A 4/1950 Zanona
2,523,559 A 9/1950 Couture
2,527,278 A 10/1950 Schemansky
2,537,736 A 1/1951 Carison
2,560,274 A 7/1951 Cantelo
2,581,816 A 1/1952 Schlueter
2,590,624 A 3/1952 James
2,599,196 A 6/1952 Peremi
2,605,125 A 7/1952 Emerson
2,612,398 A 9/1952 Miller
2,613,526 A 10/1952 Holmsten
2,621,951 A 12/1952 Ostadal
2,645,515 A 7/1953 Thomas
2,648,967 A 8/1953 Holmsten
2,670,982 A 3/1954 Banham
2,692,789 A 10/1954 Rivard
2,735,707 A 2/1956 Sylvan
2,758,862 A 8/1956 Endter
2,766,492 A 10/1956 Day
2,789,851 A 4/1957 Lickteig
2,818,919 A 1/1958 Sylvan
2,846,258 A 8/1958 Granberg
2,855,772 A 10/1958 Hillgren
2,884,276 A 4/1959 Baptist
2,886,960 A * 5/1959 Willett .................... E05B 65/10 70/120
2,920,914 A 1/1960 Jenkins
2,941,832 A 6/1960 Grossman
2,967,595 A 1/1961 Zitomer
2,980,458 A * 4/1961 Russell ............... E05B 65/0817 292/113
2,997,323 A 8/1961 Riser
3,027,188 A 3/1962 Eichstadt
3,122,387 A 2/1964 Wakelin
3,135,542 A 6/1964 Wilkenson
3,187,526 A 6/1965 Moler
3,213,652 A * 10/1965 Morton ................. E05B 65/087 292/147
3,267,613 A 8/1966 McQuiston
3,288,510 A 11/1966 Gough
3,332,182 A * 7/1967 Mark .................... E04B 2/7453 411/116
3,342,516 A * 9/1967 Morand .............. E05B 65/0057 292/6
3,352,586 A 11/1967 Hakanson
3,362,740 A 1/1968 Burns
3,400,562 A * 9/1968 Bloss .................. E05B 65/5238 70/70
3,413,025 A * 11/1968 Sperry ................ E05B 65/0817 292/26
3,422,575 A 1/1969 Armstrong
3,425,729 A 2/1969 Bisbing
3,438,153 A 4/1969 Lemme
3,469,877 A 9/1969 Hutchison
3,498,657 A * 3/1970 Fontana .............. E05B 17/0037 70/70
3,599,452 A 8/1971 Maruyama
3,600,019 A 8/1971 Toyota
3,642,315 A 2/1972 Alpern
3,645,573 A 2/1972 Strang
3,683,652 A 8/1972 Halopoff
3,706,467 A 12/1972 Martin
3,762,750 A 10/1973 Orr
3,811,718 A 5/1974 Bates
3,907,348 A 9/1975 Bates
3,919,808 A 11/1975 Simmons
3,927,906 A 12/1975 Mieras
3,930,678 A 1/1976 Alexander
4,054,308 A 10/1977 Prohaska
4,059,298 A 11/1977 Van Klompenburg
4,063,766 A 12/1977 Granberg
4,068,871 A 1/1978 Mercer
4,095,827 A 6/1978 Stavenau
4,095,829 A 6/1978 Van Klompenburg
4,102,546 A 7/1978 Costello
4,151,682 A 5/1979 Schmidt
4,165,894 A 8/1979 Wojciechowski
4,223,930 A 9/1980 Costello
4,227,345 A 10/1980 Durham
4,227,723 A * 10/1980 Rosell ..................... E05C 9/002 292/161
4,235,465 A 11/1980 Costello
4,253,688 A 3/1981 Hosooka
4,261,602 A 4/1981 Anderson
4,274,666 A 6/1981 Peck
4,293,154 A 10/1981 Cassells
4,303,264 A 12/1981 Uehara
4,305,612 A 12/1981 Hunt
4,392,329 A 7/1983 Suzuki

(56) References Cited

U.S. PATENT DOCUMENTS

| | | | | | |
|---|---|---|---|---|---|
| 4,429,910 | A | | 2/1984 | Anderson | |
| 4,470,277 | A | | 9/1984 | Uyeda | |
| 4,475,311 | A | | 10/1984 | Gibson | |
| 4,500,122 | A | * | 2/1985 | Douglas | E05B 65/087 292/341.15 |
| 4,525,952 | A | | 7/1985 | Cunningham | |
| 4,579,376 | A | * | 4/1986 | Charlton | E05B 47/026 292/144 |
| 4,580,366 | A | | 4/1986 | Hardy | |
| 4,587,759 | A | | 5/1986 | Gray | |
| 4,597,599 | A | * | 7/1986 | Bisbing | E05B 17/0037 292/DIG. 72 |
| 4,621,847 | A | | 11/1986 | Paulson | |
| 4,624,073 | A | | 11/1986 | Randall | |
| 4,639,021 | A | | 1/1987 | Hope | |
| 4,643,005 | A | * | 2/1987 | Logas | E05C 9/026 70/95 |
| 4,655,489 | A | | 4/1987 | Bisbing | |
| 4,736,972 | A | | 4/1988 | Mosch | |
| 4,801,164 | A | | 1/1989 | Mosch | |
| 4,813,725 | A | | 3/1989 | Mosch | |
| 4,824,154 | A | | 4/1989 | Simpson | |
| 4,826,222 | A | | 5/1989 | Davis | |
| 4,827,685 | A | | 5/1989 | Schmidt | |
| 4,893,849 | A | | 1/1990 | Schlack | |
| 4,922,658 | A | | 5/1990 | Coddens | |
| 4,923,230 | A | | 5/1990 | Simpson | |
| 4,949,506 | A | | 8/1990 | Durham | |
| 4,961,286 | A | | 10/1990 | Bezubic | |
| 4,973,091 | A | * | 11/1990 | Paulson | E05C 9/042 292/216 |
| 4,991,886 | A | | 2/1991 | Nolte | |
| 5,042,855 | A | | 8/1991 | Bennett | |
| 5,058,938 | A | * | 10/1991 | Doring | E05C 9/026 292/335 |
| 5,072,464 | A | | 12/1991 | Draheim | |
| 5,076,015 | A | | 12/1991 | Manzalini | |
| 5,087,087 | A | | 2/1992 | Vetter | |
| 5,087,088 | A | | 2/1992 | Milam | |
| 5,090,750 | A | | 2/1992 | Lindqvist | |
| 5,090,754 | A | | 2/1992 | Thompson | |
| 5,092,640 | A | | 3/1992 | Plummer | |
| 5,110,165 | A | | 5/1992 | Piltingsrud | |
| 5,120,094 | A | * | 6/1992 | Eaton | E05B 65/087 292/159 |
| 5,127,685 | A | | 7/1992 | Dallaire | |
| 5,139,291 | A | | 8/1992 | Schultz | |
| 5,143,412 | A | | 9/1992 | Lindqvist | |
| 5,161,839 | A | | 11/1992 | Piltingsrud | |
| 5,165,737 | A | | 11/1992 | Riegelman | |
| 5,183,310 | A | | 2/1993 | Shaughnessy | |
| 5,197,771 | A | * | 3/1993 | Kaup | E05C 9/047 292/DIG. 21 |
| 5,217,264 | A | | 6/1993 | Fier | |
| 5,219,193 | A | | 6/1993 | Piltingsrud | |
| 5,244,238 | A | | 9/1993 | Lindqvist | |
| 5,248,174 | A | | 9/1993 | Matz | |
| 5,274,955 | A | | 1/1994 | Dallaire | |
| 5,290,077 | A | * | 3/1994 | Fleming | E05C 9/047 292/DIG. 60 |
| 5,341,752 | A | | 8/1994 | Hambleton | |
| 5,373,716 | A | * | 12/1994 | MacNeil | E05C 9/1808 70/489 |
| 5,388,875 | A | * | 2/1995 | Fleming | E05C 9/026 292/37 |
| 5,398,447 | A | | 3/1995 | Morse | |
| 5,437,484 | A | | 8/1995 | Yamada | |
| 5,448,857 | A | | 9/1995 | Stormo | |
| 5,452,925 | A | | 9/1995 | Huang | |
| 5,454,609 | A | | 10/1995 | Slocomb | |
| 5,536,052 | A | | 7/1996 | Maier | |
| 5,542,720 | A | * | 8/1996 | Fleming | E05B 63/20 292/341.15 |
| 5,553,903 | A | | 9/1996 | Prete | |
| 5,560,149 | A | | 10/1996 | Lafevre | |
| 5,575,116 | A | | 11/1996 | Carlson | |
| 5,582,445 | A | | 12/1996 | Olsen | |
| RE35,463 | E | | 2/1997 | Vetter | |
| 5,636,475 | A | | 6/1997 | Nidelkoff | |
| 5,642,909 | A | * | 7/1997 | Swan | E05C 9/1841 292/25 |
| 5,688,000 | A | | 11/1997 | Dolman | |
| 5,715,631 | A | | 2/1998 | Kailian | |
| 5,741,032 | A | | 4/1998 | Chaput | |
| 5,778,602 | A | | 7/1998 | Johnson | |
| 5,791,700 | A | | 8/1998 | Biro | |
| 5,806,900 | A | | 9/1998 | Bratcher | |
| 5,829,196 | A | | 11/1998 | Maier | |
| 5,839,767 | A | | 11/1998 | Piltingsrud | |
| 5,901,499 | A | | 5/1999 | Delaske | |
| 5,901,501 | A | | 5/1999 | Fountaine | |
| 5,901,989 | A | * | 5/1999 | Becken | E05C 7/06 292/DIG. 21 |
| 5,906,403 | A | * | 5/1999 | Bestler | E05C 9/1808 292/DIG. 60 |
| 5,911,763 | A | | 6/1999 | Quesada | |
| 5,927,768 | A | | 7/1999 | Dallmann | |
| 5,970,656 | A | | 10/1999 | Maler | |
| 5,992,907 | A | | 11/1999 | Sheldon | |
| 6,000,734 | A | * | 12/1999 | Prevot | E05B 63/185 292/99 |
| 6,000,735 | A | | 12/1999 | Jourdenais | |
| 6,086,121 | A | | 7/2000 | Buckiand | |
| 6,116,665 | A | | 9/2000 | Subliskey | |
| 6,135,510 | A | | 10/2000 | Diginosa | |
| 6,139,071 | A | | 10/2000 | Hopper | |
| 6,142,541 | A | | 11/2000 | Rotondi | |
| 6,155,615 | A | | 12/2000 | Schulz | |
| 6,176,041 | B1 | | 1/2001 | Roberts | |
| 6,178,696 | B1 | | 1/2001 | Liang | |
| 6,183,024 | B1 | | 2/2001 | Schultz | |
| 6,209,931 | B1 | | 4/2001 | Von Stoutenborough | |
| 6,217,087 | B1 | | 4/2001 | Fuller | |
| 6,230,443 | B1 | | 5/2001 | Schultz | |
| 6,250,694 | B1 | | 6/2001 | Weiland | |
| 6,270,129 | B1 | * | 8/2001 | Prevot | E05C 9/22 292/300 |
| 6,279,266 | B1 | | 8/2001 | Searcy | |
| 6,349,576 | B2 | | 2/2002 | Subliskey | |
| 6,364,375 | B1 | | 4/2002 | Szapucki | |
| 6,450,544 | B2 | | 9/2002 | Rotondi | |
| 6,546,671 | B2 | | 4/2003 | Mitchell | |
| 6,565,133 | B1 | | 5/2003 | Timothy | |
| 6,568,723 | B2 | | 5/2003 | Murphy | |
| 6,585,301 | B1 | * | 7/2003 | Prevot | E05C 9/185 292/8 |
| 6,588,150 | B1 | | 7/2003 | Wong | |
| 6,592,155 | B1 | | 7/2003 | Lemley | |
| 6,607,221 | B1 | | 8/2003 | Elliot | |
| 6,631,931 | B2 | | 10/2003 | Magnusson | |
| 6,634,683 | B1 | | 10/2003 | Brannan | |
| 6,637,784 | B1 | * | 10/2003 | Hauber | E05B 65/087 292/300 |
| 6,688,659 | B2 | | 2/2004 | Kobrehel | |
| 6,817,142 | B2 | | 11/2004 | Marshik | |
| 6,848,728 | B2 | | 2/2005 | Rotondi | |
| 6,871,885 | B2 | | 3/2005 | Goldenberg | |
| 6,871,886 | B2 | | 3/2005 | Coleman | |
| 6,877,784 | B2 | | 4/2005 | Kelley | |
| 6,925,758 | B2 | | 8/2005 | Petit | |
| 6,957,513 | B2 | | 10/2005 | Pettit | |
| 6,983,963 | B2 | | 1/2006 | Eslick | |
| 7,000,957 | B2 | | 2/2006 | Lawrence | |
| 7,013,603 | B2 | | 3/2006 | Eenigenburg | |
| 7,017,957 | B2 | | 3/2006 | Murphy | |
| 7,036,851 | B2 | | 5/2006 | Romig | |
| 7,063,361 | B1 | | 6/2006 | Lawrence | |
| 7,070,211 | B2 | | 7/2006 | Polowinczak | |
| 7,070,215 | B2 | | 7/2006 | Kelley | |
| 7,100,951 | B2 | | 9/2006 | Jien | |
| 7,147,255 | B2 | | 12/2006 | Goldenberg | |
| 7,159,908 | B2 | | 1/2007 | Liang | |
| 7,171,784 | B2 | | 2/2007 | Eenigenburg | |

(56) References Cited

U.S. PATENT DOCUMENTS 7,296,831 B2 11/2007 Generowicz
7,322,619 B2 1/2008 Nolte
7,322,620 B1 1/2008 Lawrence
7,353,637 B2 * 4/2008 Harger .................... E05C 9/185 49/449
7,404,306 B2 * 7/2008 Walls ...................... E05C 9/185 70/451
7,407,199 B2 8/2008 Richardson
7,418,845 B2 * 9/2008 Timothy ............... E05B 63/185 70/121
7,421,868 B2 * 9/2008 Matyko ................... E05C 9/047 70/201
7,431,356 B2 10/2008 Liang
7,441,811 B2 10/2008 Lawrence
7,481,470 B2 1/2009 Eenigenburg
7,510,221 B2 3/2009 Eenigenburg
7,513,540 B2 * 4/2009 Hagemeyer ......... E05B 15/0205 292/341.15
7,526,933 B2 * 5/2009 Meekma ................. E05C 9/185 70/120
7,530,611 B2 5/2009 Liang
7,559,588 B2 7/2009 Liang
7,607,262 B2 10/2009 Pettit
7,637,544 B2 12/2009 Liang
7,665,775 B1 2/2010 Miller
7,699,365 B2 4/2010 Liang
7,871,112 B2 * 1/2011 Kondratuk ............ E05B 63/042 292/137
7,922,223 B2 4/2011 Lawrence
7,976,077 B2 7/2011 Flory
8,205,919 B2 6/2012 Flory
8,205,920 B2 6/2012 Flory
8,220,846 B2 7/2012 Liang
8,231,148 B2 7/2012 Van Der Kooij
8,235,430 B2 8/2012 Liang
8,272,164 B2 9/2012 Albrecht
8,336,930 B2 12/2012 Liang
8,360,484 B2 1/2013 Liang
8,398,126 B2 * 3/2013 Nakanishi ............... E05C 9/041 292/DIG. 60
8,414,039 B2 4/2013 Liang
8,511,724 B2 8/2013 Liang
8,550,506 B2 * 10/2013 Nakanishi ................. E05C 9/04 292/DIG. 21
8,550,507 B2 10/2013 Barton
8,567,830 B2 10/2013 Liang
8,657,347 B2 2/2014 Liang
8,726,572 B2 5/2014 Derham
8,789,857 B2 7/2014 Liang
8,789,862 B2 7/2014 Liang
8,833,809 B2 9/2014 Liang
8,844,985 B2 9/2014 Liang
8,870,244 B2 10/2014 Liang
8,881,461 B2 11/2014 Derham
8,899,635 B2 * 12/2014 Nakanishi ........... E05B 63/0056 292/194
8,939,474 B2 * 1/2015 Hagemeyer ............. E05B 63/14 292/137
9,051,763 B2 * 6/2015 Taylor ....................... E05C 9/20
9,103,144 B2 8/2015 Liang
9,140,033 B2 9/2015 Wolf
9,376,834 B2 6/2016 Liang
9,493,970 B2 11/2016 Campbell
9,637,957 B2 * 5/2017 Hagemeyer ............. E05C 1/004
9,790,716 B2 * 10/2017 Hagemeyer ......... E05B 65/0858
9,816,300 B2 11/2017 Derham
10,107,021 B1 10/2018 Liang
10,890,016 B2 * 1/2021 Brewer ............... E05B 65/0823
12,560,006 B2 * 2/2026 Goldstein ................. E05C 9/04
2006/0192391 A1 8/2006 Pettit
2006/0244270 A1 11/2006 Rotondi
2007/0205615 A1 9/2007 Eenigenburg
2008/0012358 A1 1/2008 Liang
2008/0022728 A1 1/2008 Flory
2008/0169658 A1 7/2008 Wolf
2010/0199726 A1 8/2010 Varney
2010/0218425 A1 9/2010 Nolte
2010/0263415 A1 10/2010 Rupsil
2013/0214545 A1 8/2013 Wolf
2013/0283695 A1 10/2013 Hollerman
2016/0076282 A1 3/2016 Wolf
2023/0104532 A1 * 4/2023 Condorodis .......... E05B 65/087 70/95

FOREIGN PATENT DOCUMENTS

GB 2 461 107 12/2009
GB 2 461 108 12/2009
JP 2003041812 A 2/2003

OTHER PUBLICATIONS

"Three General Types of Fit," available at www.mmto.org/dclark/Reports/Encoder%20Upgrade/fittolerences%20%5BRead-Only%5D.pdf., Jul. 8, 2019.
"Engineering Fit," available at: https://en.wikipedia.org/wiki/Engineering_fit, Jul. 8, 2019.

* cited by examiner

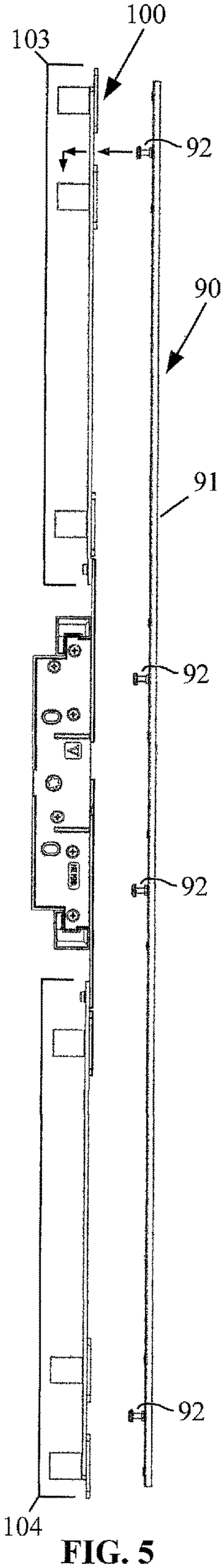
FIG. 5
FIG. 6A
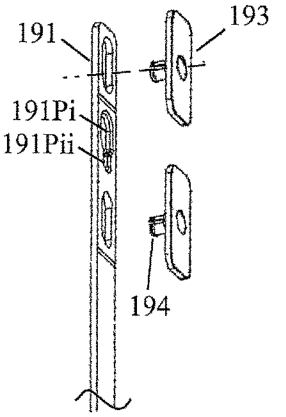
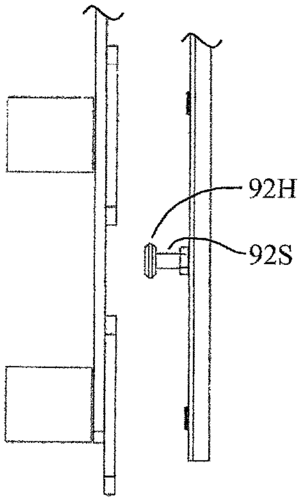
FIG. 5A
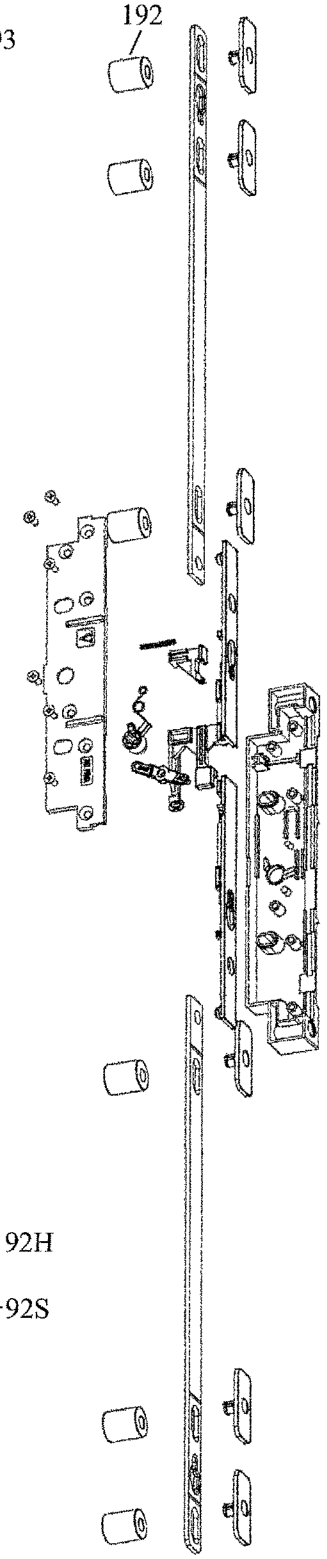
FIG. 6
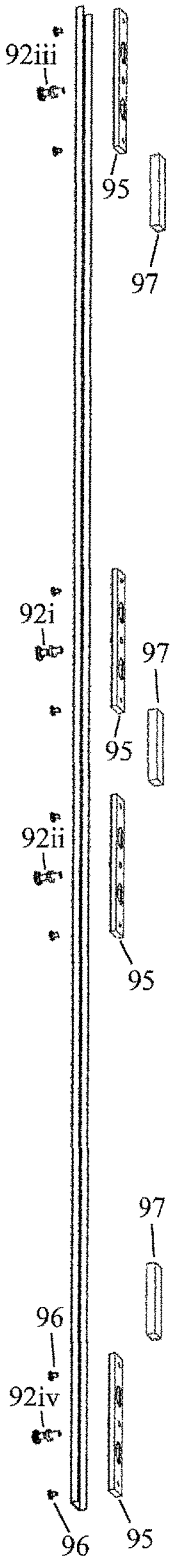
FIG. 7

FIG. 11A
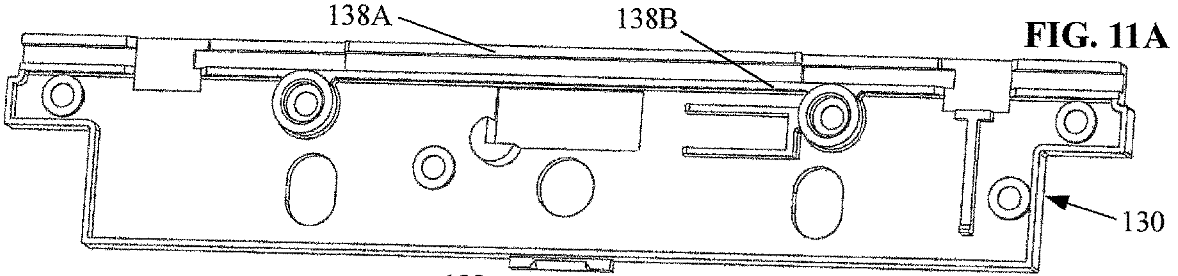
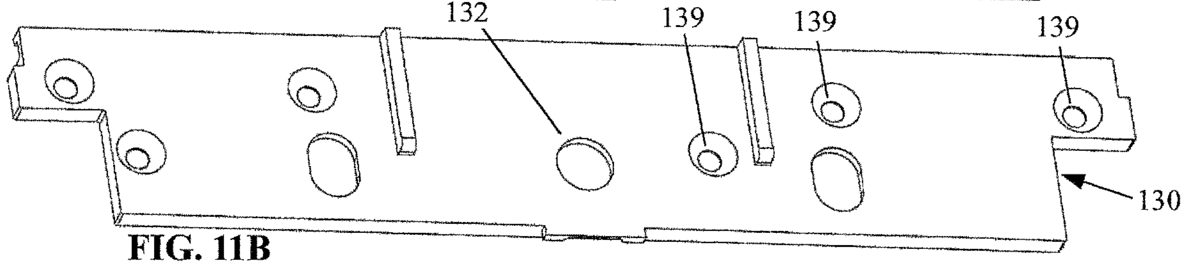
FIG. 11B
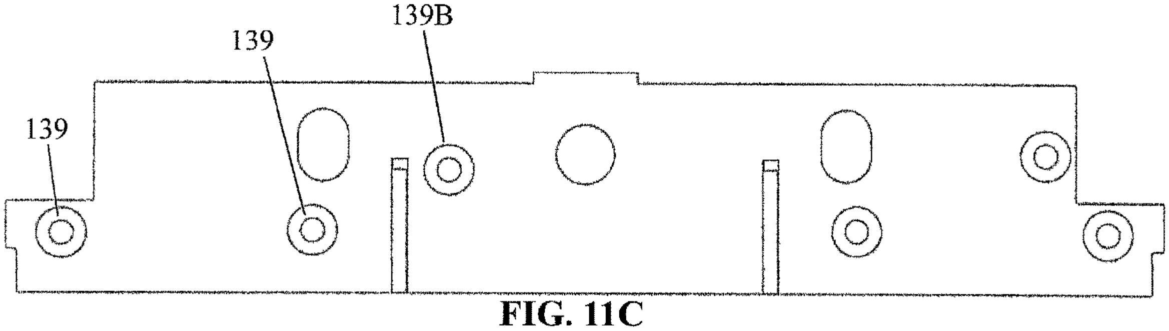
FIG. 11C
FIG. 11D
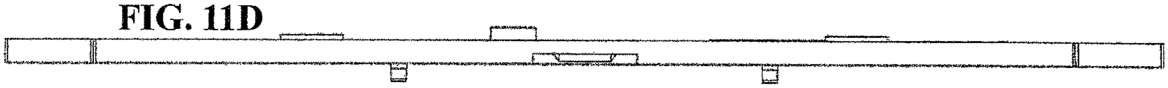
FIG. 11E
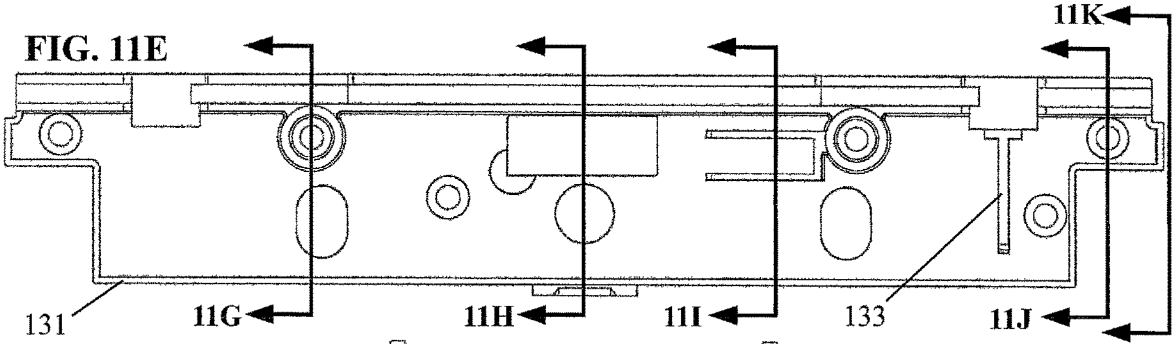
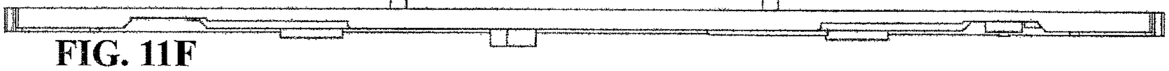
FIG. 11F
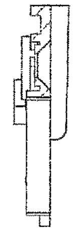
FIG. 11G
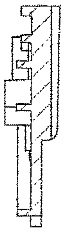
FIG. 11H
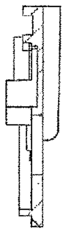
FIG. 11I
FIG. 11J
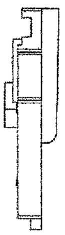
FIG. 11K

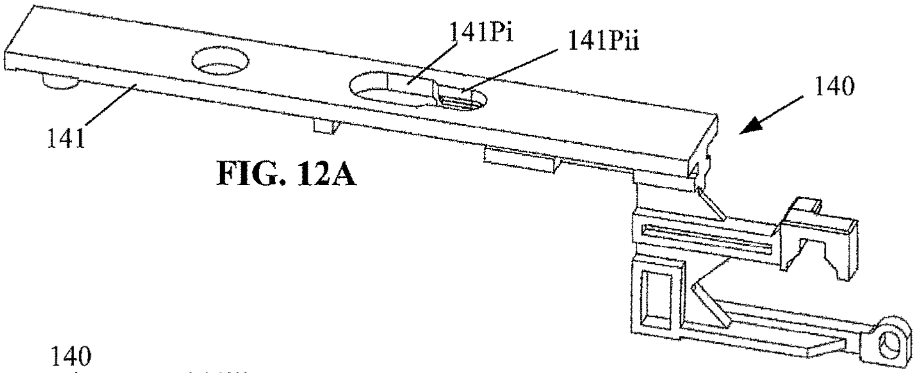
FIG. 12A
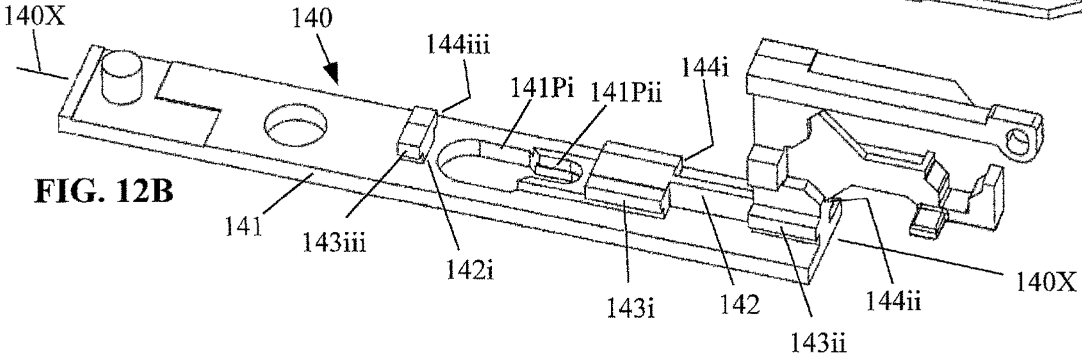
FIG. 12B
FIG. 12G
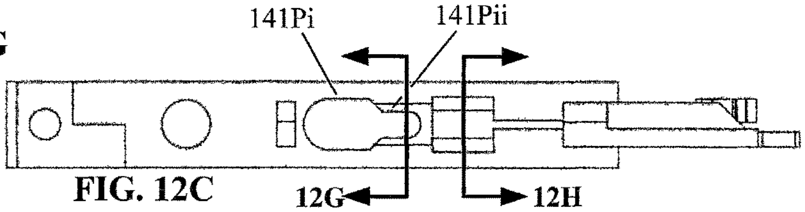
FIG. 12C
FIG. 12H
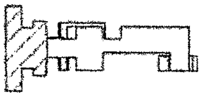
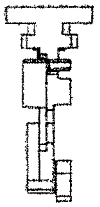
FIG. 12J
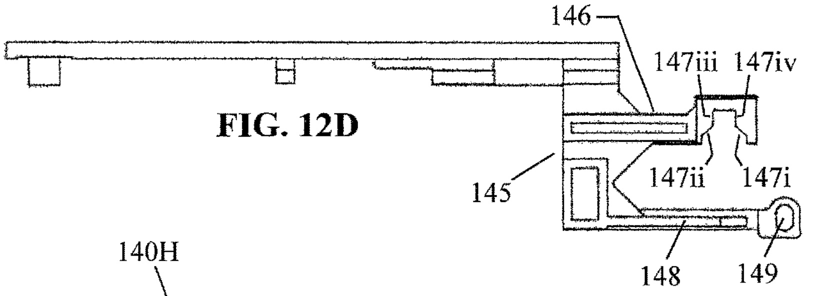
FIG. 12D
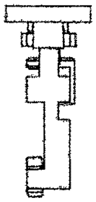
FIG. 12I
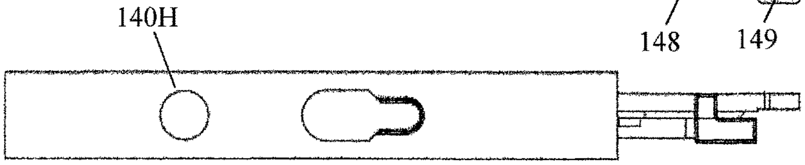
FIG. 12E
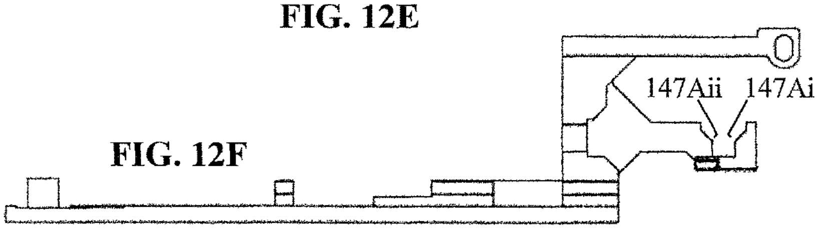
FIG. 12F FIG. 13A
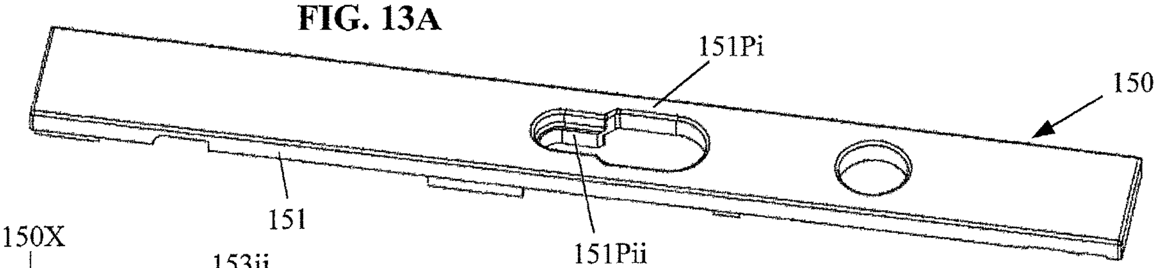
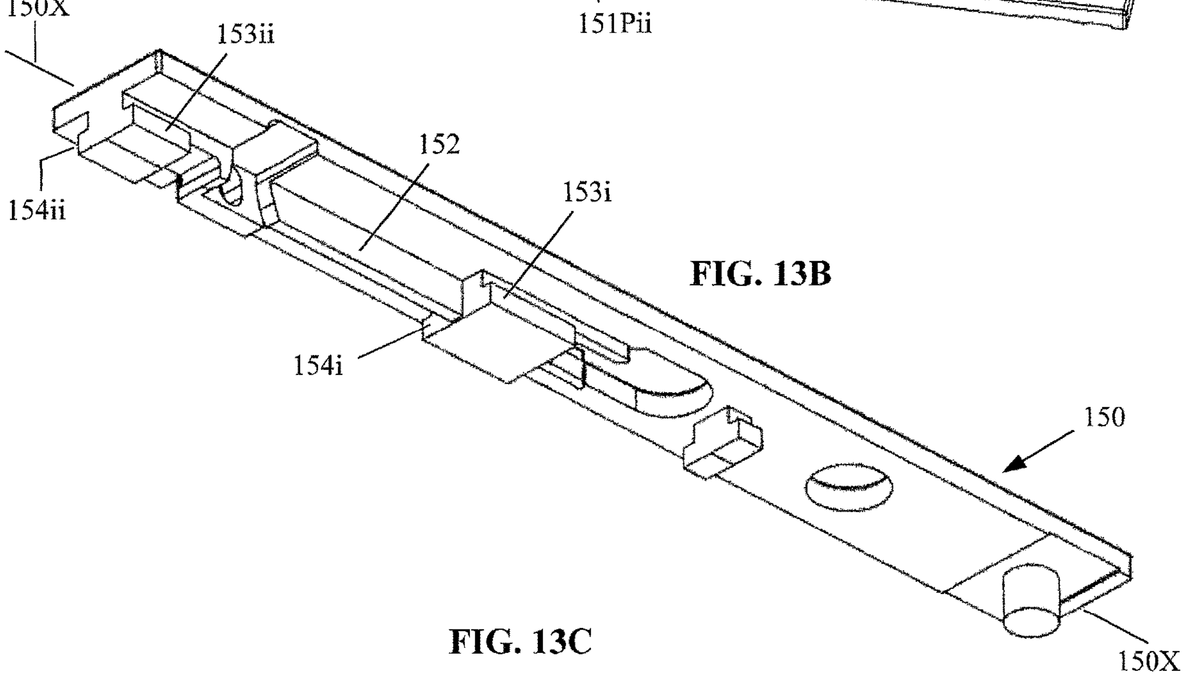
FIG. 13B
FIG. 13C
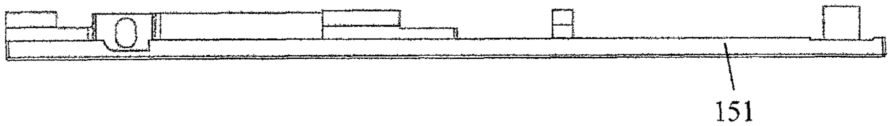
FIG. 13D
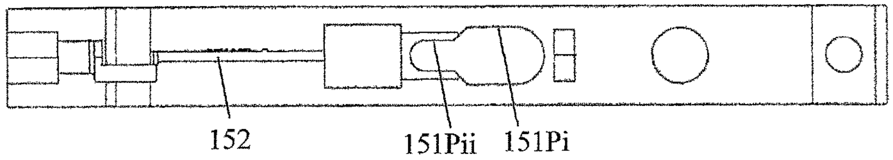
FIG. 13E
FIG. 13H
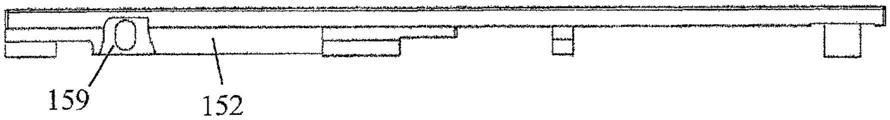
FIG. 13G
FIG. 13F
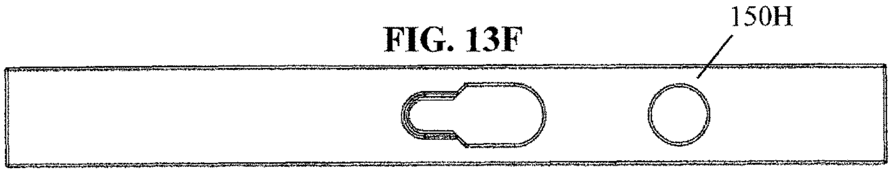

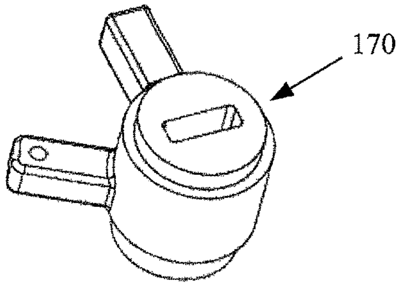
FIG. 14A
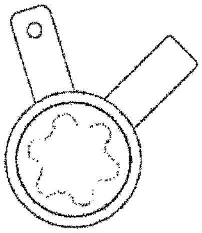
FIG. 14H
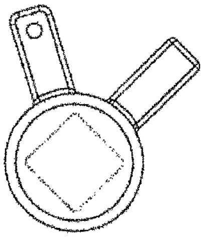
FIG. 14I
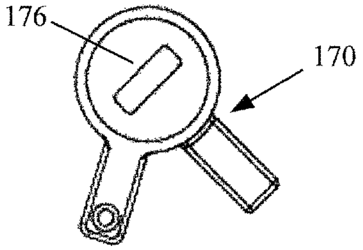
FIG. 14B
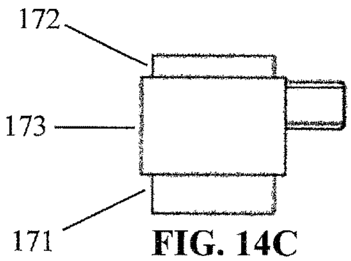
FIG. 14C
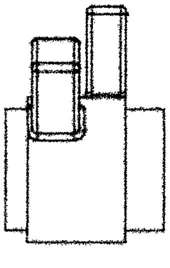
FIG. 14F
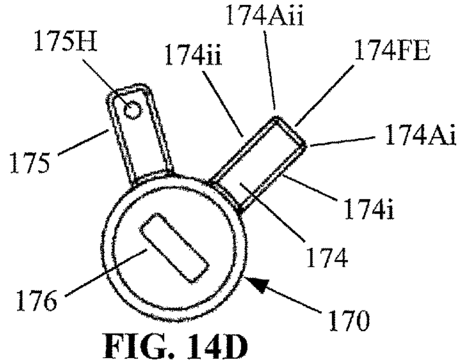
FIG. 14D
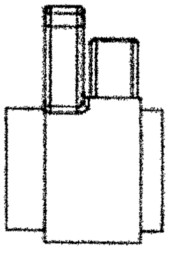
FIG. 14G
FIG. 14E
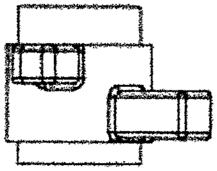

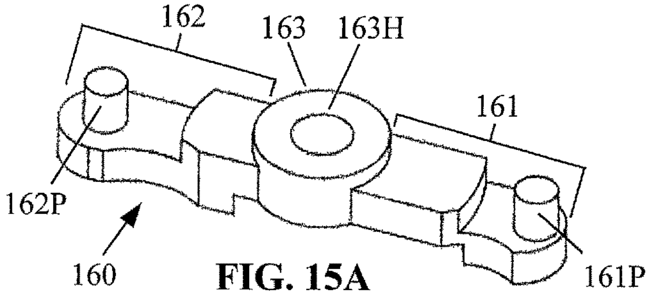
FIG. 15A
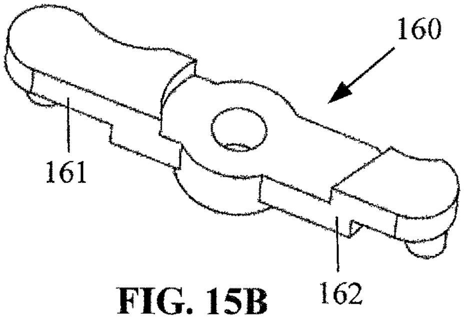
FIG. 15B
FIG. 15C
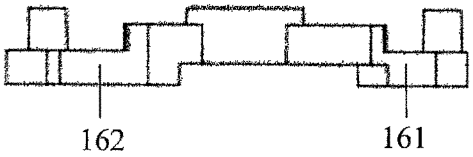
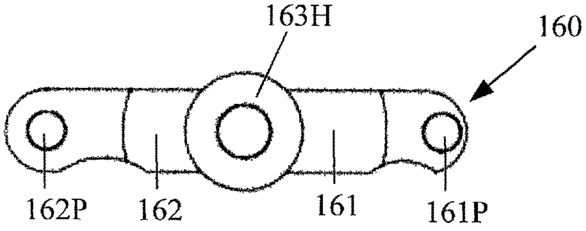
FIG. 15D
FIG. 15H
FIG. 15E
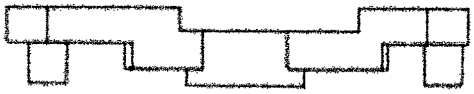
FIG. 15G
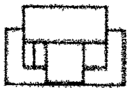
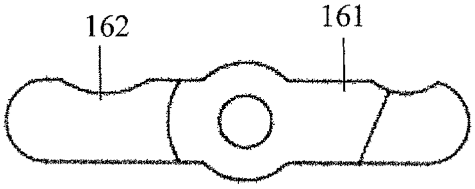
FIG. 15F

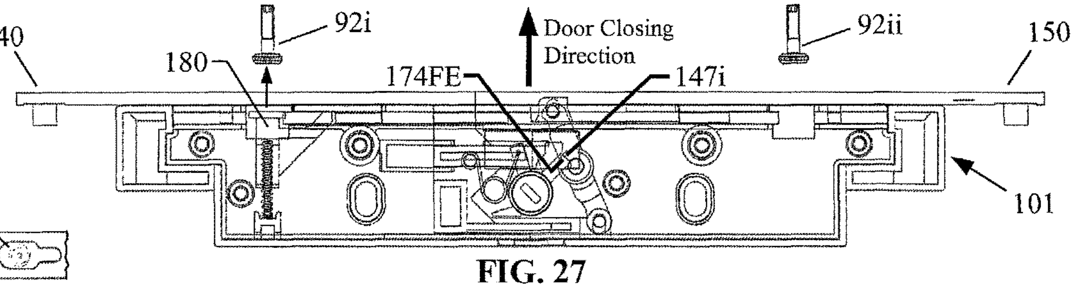
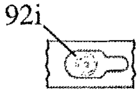
FIG. 28A
FIG. 27
(Unlocked, Door Opened Position)
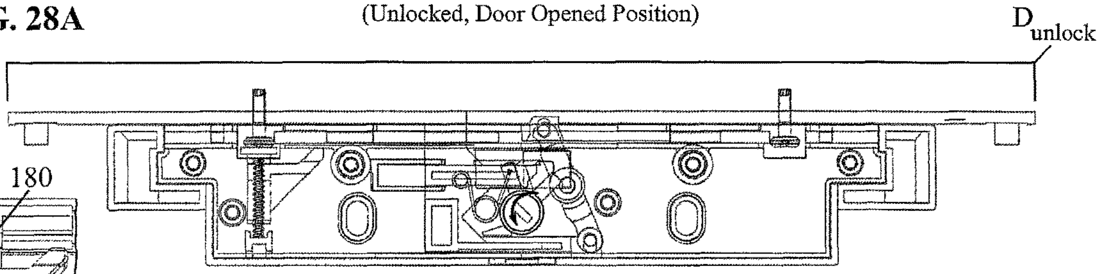
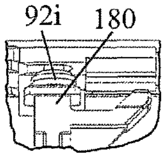
FIG. 28B
FIG. 28
(Unlocked, Door Closed Position @ 2nd Rotation Position of Driving Member)
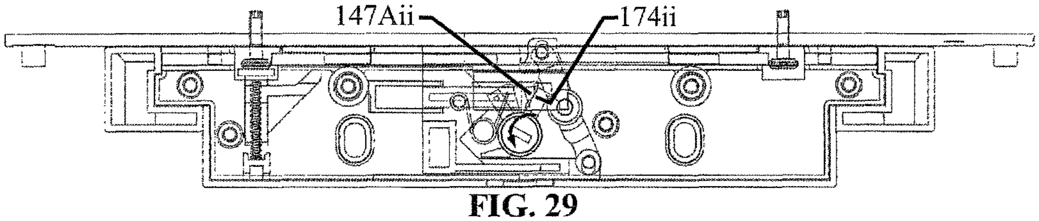
FIG. 29
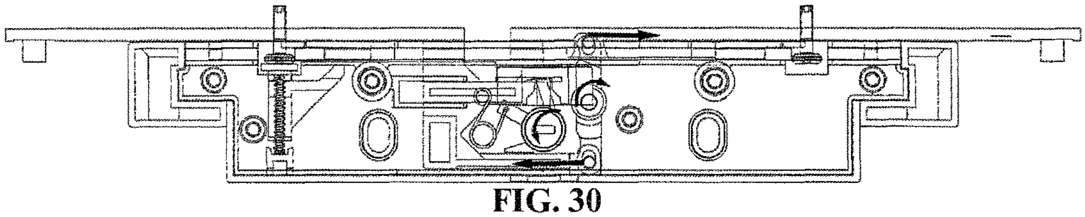
FIG. 30
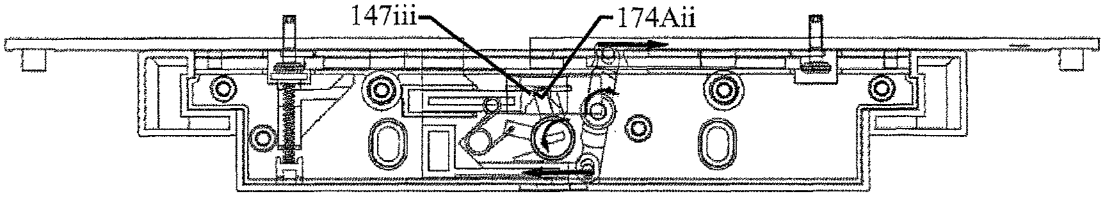
FIG. 31
(Locked, Door Closed Position)
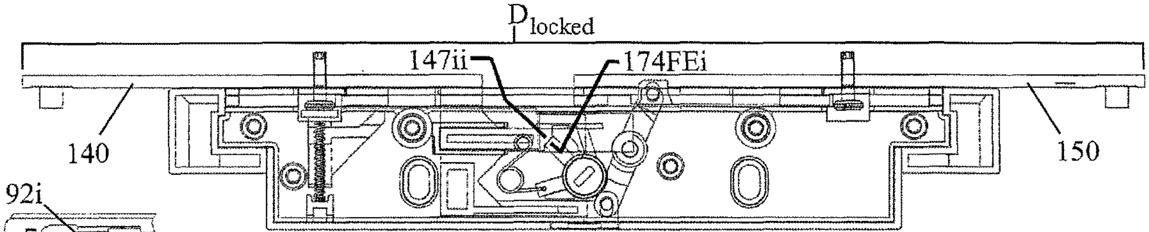
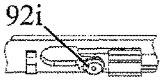
FIG. 32A
FIG. 32
(Locked, Forced Entry Resistant @ 1st Rotation Position of Driving Member)

FIG. 41
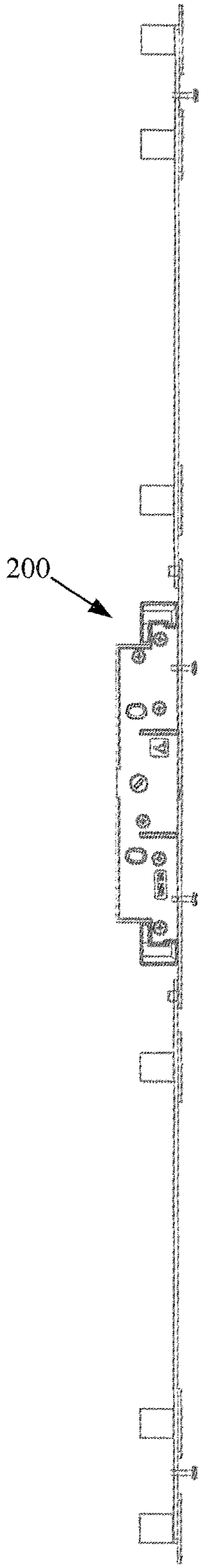
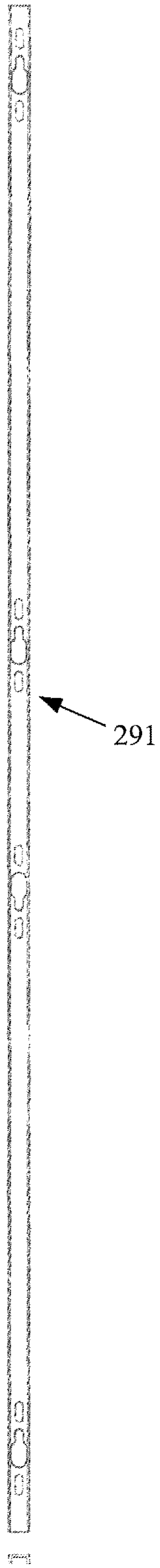
FIG. 40
FIG. 42

MULTI-POINT LOCKING SYSTEM FOR PATIO DOORS, FRENCH DOORS/WINDOWS, LARGE CASEMENT WINDOWS, AND THE LIKE

CROSS-REFERENCES

This application claims priority on U.S. Provisional Patent Application Ser. No. 63/617,120, filed on Jan. 3, 2024, the disclosures of which are incorporated herein by reference.

FIELD OF THE INVENTION

The present invention relates to multi-point locking systems for patio doors, and more particularly relates to an improved multi-point lock that is more easily and simply manufactured, which provides for smoother operation during the locking and unlocking of the device to securely lock a tall door at least at four separate points, and which is forced-entry-resistant and also prevents locking of the lock while in the door open position.

BACKGROUND OF THE INVENTION

Patio doors, French doors/windows, large casement windows, and even the rear doors of a trailer of a semi-trailer truck have long frames that engage with and need to lock with respect to a master frame, when in a closed position. As such, it is beneficial to provide multiple points at which the tall doors/windows are secured in a locked position with respect to the master frame.

These locks are sometimes referred to as multi-point locks and/or espagnolette locks, and may include a locking knob that may actuate a pair of bars (or rods) that may engage a keeper or other feature of the master frame to secure the door/window in the locked position.

The herein disclosed multi-point locking system provides improvements upon prior art locks, by providing a unique lock mechanism that is more easily and simply manufactured, and which provides for smoother operation during the unlocking and locking of the device to securely lock a tall door at least at four separate points, which is forced-entry-resistant and also prevents locking of the lock while in the door open position.

OBJECTS OF THE INVENTION

It is an object of the invention to provide a lock for a sliding door or window.

It is another object of the invention to provide a lock assembly configured to lock patio doors, French doors/windows, large casement windows, and the like, which have long frames that engage with and lock with respect to a master frame, when in a closed position.

It is a further object of the invention to provide a lock assembly configured to lock patio doors, French doors/windows, and large casement windows at multiple points along a keeper that is secured within a track of the master frame.

It is another object of the invention to provide an improved patio door lock, with a unique lock mechanism that is more easily and simply manufactured, and which provides for smoother operation during the locking and unlocking of the door.

It is a further object of the invention to provide an improved lock that prevents actuation of the lock mechanism into a locked position unless the door/window has been slid into the closed position.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A lock system is configured to lock a patio door, or French doors/windows, or large casement windows, and the like, with respect to a keeper that is secured to a master frame, at a plurality of locations of the keeper. The lock system may include: a lock assembly and a corresponding keeper.

The keeper may be formed to include a plurality of particularly shaped lock pins, each of which may include a shaft portion and a head portion. In one embodiment, the keeper may be formed to include two lock pins. In another embodiment, the keeper may be formed to include four lock pins. In other embodiments, different numbers of lock pins may be used on the keeper, and the arrangement need not utilize an even number of lock pins, and a symmetrical arrangement of lock pins is also not required.

The lock assembly includes a housing, a cover, a first locking member, a second locking member, a rocker arm, and a driving member.

The housing may generally be box shaped, and may be formed to have a main opening on a first side that defines an interior surface of a housing cavity, and a second opening formed on a central portion of an adjacent side that interconnects with the housing cavity, thereby forming at least a rear wall, a bottom wall, a first side wall, and a second side wall. The rear wall is formed to include a first flange and a second flange, that are parallel, and which are configured to form a track. The track of the housing may be positioned between the first wall portion and the second wall portion.

In one embodiment the cover may be particularly shaped to match the entire profile of the housing, and in another embodiment, the cover may be formed with a shape that is configured to only (or to principally) enclose/seal the main opening of the housing, when the cover is secured to the housing. The cover member may also be formed with a first flange and a second flange that are parallel, and which are also configured to form a track. When the cover member is secured to the housing, the track of the cover member is aligned with the track of the housing. The cover may be secured to the housing using any joining method known in the art, including, but not limited to, using mechanical fasteners (e.g., screws, bolts, threaded inserts, nuts, etc.), adhesive, a friction fit, welding techniques, hook and loop fastening materials sold under the trademark VELCRO®, etc.

The first locking member may be formed to include a main flange that may have an elongated opening. The elongated opening may have a first opening portion with a first width, and a second opening portion with a second width, where the first width is greater than said second width. The larger first width is configured to permit sliding therethrough of the head portion of a lock pin of the keeper, while the narrower second width is configured to engage with (e.g., to surround and be adjacent to) the shaft portion of the lock pin, being sized to prevent the head portion from passing through the narrower second portion of the elongated opening, which serves to inhibit sliding of the door and thereby locks the door in the closed position, as described hereinafter. The first locking member may also be formed to include a protrusion that protrudes from a first side of the main flange, where the protrusion includes a first slider member and a second slider member. The first and second slider members protrude in a first lateral direction and a second lateral direction, respectively, being lateral with respect to an axial direction of the main flange. The first slider member and the second slider member are configured to be slidably received in a first portion of the track in the housing and a first portion of the track in the cover member, respectively. The first locking member may also be formed to include a first cam following surface and a second cam following surface.

The second locking member is similarly formed with a main flange that has an elongated opening having a first portion with a first width and a second portion with a second width, to respectively permit sliding passage and block sliding passage of the head portion of a lock pin of the keeper. The second locking member also has protruding first and second slider members that are slidably received in a second portion of the track in the housing and a second portion of the track in the cover member, respectively.

A rocker arm is formed with: a hub, a first arm configured to extend from a first portion of the hub, and a second arm configured to extend from a second portion of the hub. The hub of the rocker arm is pivotally mounted to the housing, while the first arm is pivotally coupled to the first locking member, and the second arm is pivotally coupled to the second locking member, thereby coupling sliding movement of the second locking member to the first locking member, such that they move in opposite sliding directions.

A driving member is also pivotally mounted to the housing and configured to be actuated (i.e., to be rotated) by a user. The driving member includes a cam feature(s). When the driving member is rotated from a first rotation position to a second rotation position, the cam contacts the first cam following surface of the first locking member and thereby drives the first locking member to slide in a first unlock direction, which causes the second locking member to be driven by the rocker arm to slide in a second unlock direction (being a direction opposite to the first unlock direction), to cause the first width of the elongated opening of the first locking member to align with a first lock pin on the keeper and also cause the first width of the elongated opening of the second locking member to align with a second lock pin on the keeper, to unlock the lock system and permit the door/window to slide away from the keeper into a door open position.

The lock assembly may also include a safety button that is slidably mounted to the housing, such that it may slide between a first button position and a second button position. A spring is used to bias the safety button towards the first button position. Being so configured, when the safety button is in the first button position, a portion of the button serves to block the first locking member from sliding away from its unlocked position in the first unlock direction, thereby preventing a user from accidentally locking the lock assembly when the door has been slid into a door open position, otherwise sliding (or slamming) of the door shut without the safety button would cause damage (e.g., permanent deformation) of portions of the lock assembly (e.g., the first and second locking members), as a result of the head portion of the lock pins of the keeper being driven/forced into and through the narrower second width of the openings of the first and second actuation members.

With use of the safety button in the lock assembly, when the door is in a door open position, and is slid towards the closed door position (e.g., a position where the frame of the door contacts the keeper and/or it contacts the master door/window frame), the first lock pin of the keeper is received through the first width of the elongated opening of the first locking member and drives the safety button, in opposition to its biasing, from the first button position to the second button position, thereafter permitting locking of the lock assembly. The second lock pin of the keeper may merely pass through the first width of the elongated opening of the second locking member.

As to locking of the lock assembly, when the user rotates the driving member from the second rotation position to the first rotation position, the cam contacts the second cam following surface to drive the first locking member to slide in a first lock direction, causing the second locking member to be driven by the rocker arm to slide in a second lock direction, to cause the second width of the elongated opening of the first locking member to engage with the shaft portion of the first lock pin and simultaneously cause the second width of the elongated opening of the second locking member to engage with the shaft portion of second lock pin, so that those narrower opening are trapped between a flange of the keeper and the head portion of the pins of the keeper, thereby preventing the patio door from sliding away from the keeper into a door open position, resulting in locking of the lock assembly, and thus locking of the movement of the door/window.

Since patio doors (and other similar doors and windows) are very tall, it may be desirable that they are locked at multiple points away from the two points where the lock assembly is locked with respect to the first and second lock pins of the keeper. As such, the keeper may be formed with additional lock pins. In one embodiment, the keeper may be formed with a third lock pin, and a fourth lock pin, where each of the third lock pin and fourth lock pin are also formed to include a shaft portion and a head portion. Also, the lock assembly may additionally include a first locking bar assembly and a second locking bar assembly, which may be formed the same. Each locking bar assembly may include a bar (or plate, which terms may be used interchangeably herein) that has an elongated opening formed the same as the elongated opening in each of the first and second locking members. The bar of the first locking bar assembly is secured to the first locking member, and the bar of the second locking bar assembly is secured to the second locking member. Spacers may also be secured to each bar of each locking bar assembly to maintain its proper positioning to accommodate its use on various different door configurations. Therefore, when the driving member is rotated from the second rotation position to the first rotation position, the cam contacts the second cam following surface to drive the first locking member to slide in the first lock direction, causing the second locking member to be driven by the rocker arm to slide in the second lock direction, and also causes corresponding movement of the bars of the first and second locking bar assemblies, to thereby lock the bar of the first locking bar assembly with respect to the third lock pin of the keeper, and to lock the bar of the second locking bar assembly with respect to the fourth lock pin, to lock the lock door/window at four locations with respect to the keeper.

The lock assembly may also include a torsion spring, where a first end of the torsion spring may be secured to a particular location of the housing, and a second end of the torsion spring may be secured to a particular location of the driving member. Being so configured, the torsion spring may bias the driving member towards the second rotation position when the driving member is at a first intermediate rotation position, which may be a rotation position closer to the the second rotation position than the first rotation position, and may also bias the driving member towards the first rotation position when the driving member is at a second intermediate position, which may be a rotation position being closer to the the first rotation position than the second rotation position.

BRIEF DESCRIPTION OF DRAWINGS

FIG. 5 is the side view of FIG. 3, but is shown with the keeper disengaged from the lock assembly and separated therefrom.

FIG. 5A is an enlarged detail view of the lower portion of the keeper and lock assembly shown in FIG. 5.

FIG. 6 is an exploded view of the component parts of the full lock assembly of FIG. 5.

FIG. 6A is an enlarged detail view of the component parts of the locking bar assembly shown in the upper portion of FIG. 6.

FIG. 7 is an exploded view of the component parts of the keeper assembly of FIG. 5.

FIG. 11A and FIG. 11B are first and second perspective views of the cover of the lock box assembly of FIG. 9A.

FIG. 11C, FIG. 11D, FIG. 11E, and FIG. 11F are a first side view, a bottom view, a second side view, and a top view of the cover of FIG. 11A.

FIG. 11G, FIG. 11H, FIG. 11I, and FIG. 11J are section cuts taken at different positions along the length of the cover as indicated in FIG. 11E.

FIG. 11K is an end view of the cover as indicated in FIG. 11E.

FIG. 12A and FIG. 12B are first and second perspective views of the first locking member of the lock box assembly of FIG. 9A.

FIG. 12C, FIG. 12D, 12E, and FIG. 12F are a bottom view, a first side view, a top view, and a second side view of the first locking member of FIG. 12A.

FIG. 12G and FIG. 12H are section cuts taken at different positions along the length of the first locking member as indicated in FIG. 12C.

FIG. 12I and FIG. 12J are first and second end views of the first locking member of FIG. 12D.

FIG. 13A and FIG. 13B are first and second perspective views of the second locking member of the lock box assembly of FIG. 9A.

FIG. 13C, FIG. 13D, FIG. 13E, and FIG. 13F are a bottom view, a first side view, a top view and a second side view of the second locking member of FIG. 13A.

FIG. 13G and FIG. 13H are first and second end views of the second locking member of FIG. 13E.

FIG. 14A is a perspective view of the driving member of the lock box assembly of FIG. 9A.

FIG. 14B, FIG. 14C, FIG. 14D, and FIG. 14E are a bottom view, a first side view, a top view, and a second side view of the driving member of FIG. 14A.

FIG. 14F and FIG. 14G are first and second end views of the driving member of FIG. 14D.

FIG. 14H and FIG. 14I show top views of first and second alternate embodiments of the driving member of FIG. 14A, which respectively use a keyway that has a spline shape and a rectangular shape, instead of the slotted shape of FIG. 14D.

FIG. 15A and FIG. 15B are first and second perspective views of the rocker arm of the lock box assembly of FIG. 9A.

FIG. 15C, FIG. 15D, FIG. 15E, and FIG. 15F are a bottom view, a first side view, a top view, and a second side view of the rocker arm of FIG. 15A.

FIG. 15G and FIG. 15H are first and second end views of the rocker arm of FIG. 15E.

FIG. 27 shows the view of the lock box assembly shown in FIG. 17A, being shown in an unlocked condition, when the door/lock is adjacent to the keeper, in a door open position.

FIG. 28 shows the lock box assembly of FIG. 27, but is shown after the door has been slid into a door closed position, so that a first lock pin of the keeper contacts and depresses the safety button, thereafter permitting sliding movement of the first locking member (i.e., permitting locking of the lock box assembly).

FIG. 28A is an enlarged top view of the lock assembly of FIG. 28, showing the first opening portion in the first locking member that has the larger width, after becoming substantially aligned with the first lock pin on the keeper.

FIG. 28B is an enlarged perspective view of the lock assembly showing the first lock pin of the keeper after having contacted and depressed the safety button, as seen in FIG. 28.

FIG. 29 shows the lock box assembly of FIG. 28, but is shown after the driving member has initially been pivoted by a user, so that a first portion of a first side of the cam of the driving member just makes contact with a first cam following surface on the first locking member.

FIG. 30 shows the lock box assembly of FIG. 29, but is shown after the driving member has been further pivoted by a user, and also showing the first portion of the first side of the cam of the driving member transitioning away from contact with the first cam following surface on the first locking member.

FIG. 31 shows the view of FIG. 30, but is shown after the driving member has continued to be pivoted by a user, so that a corner of the first side of the cam of the driving member makes contact with, and drives the second cam following surface on the first locking member into a locked position, and simultaneously, using the rocker, also thereby causes the second locking member to be driven into a locked position.

FIG. 32 shows the view of FIG. 31, but is shown after the driving member has been further pivoted by a user, so that a flat surface being adjacent to the first side, and also being adjacent to a second side of the cam of the driving member, is positioned in close proximity to a corresponding flat surface of the cam on the first locking member, so that the first locking member is in a forced-entry-resistant locked position.

FIG. 32A is an enlarged perspective view of the lock assembly as positioned in FIG. 32, with the lock box assembly in the forced-entry resistant locked position, showing the narrower width in the first locking member completely underlying the head of the first lock pin on the keeper.

FIG. 40 and FIG. 41 are respectively a side view showing an alternate embodiment of the lock assembly shown in FIG. 5, and a front view showing an alternate embodiment of the keeper assembly shown in FIG. 5, in which alternate embodiments the elongated openings are formed on the channel section of the keeper assembly, and the lock pins are carried on the first and second locking members and on the elongated bars of the locking bar assemblies.

FIG. 42 is an end view of the channel section of the keeper assembly shown in FIG. 41.

DETAILED DESCRIPTION OF THE INVENTION

Figure 1:
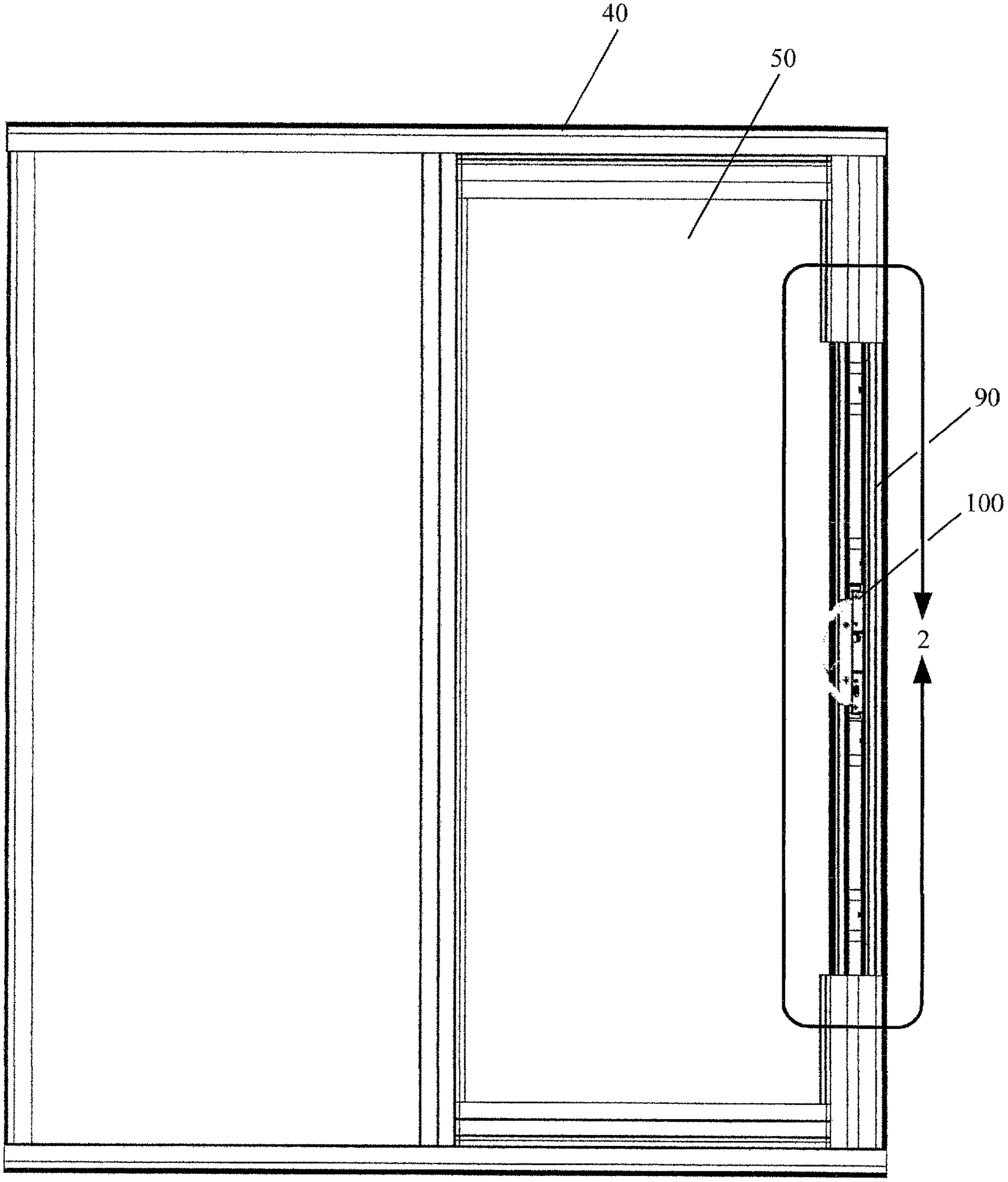
FIG. 1 is front view of a patio door, after being installed to slide in a master door frame that has a keeper secured thereto, and a particular lock assembly, as disclosed herein, after being installed on the patio door.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value or recitation modified by a term such as "about" is not to be limited to the precise theoretical characteristic or value specified, and may include values that differ from the specified value in accordance with design variations that may be described in the specification, as well as applicable case law. Also, in at least some instances, a numerical difference provided by the approximating language may correspond to the precision of an instrument that may be used for measuring the value or characteristic (e.g., a recitation of being "substantially straight"). A numerical difference provided by the approximating language may also correspond to a manufacturing tolerance associated with production of the aspect/feature being quantified/described (see e.g., *Ex Parte Ollmar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Similarly, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole/recess) is larger than the part received therein (e.g., a shaft/protrusion), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: en.wikipedia.org/wiki/Engineering_fit; and "Three General Types of Fit," available at mmto.org/~dclark/Reports/Encoder%20Upgrade/fittolerences %20%5BRead-Only%5D.pdf.

It is further noted that any use herein of relative terms such as "top," "bottom," "upper," and "lower" are merely intended to be descriptive for the reader, and may be based on the depiction of the apparatus within one of the figures for one particular position of the assembly (i.e., typically being vertically oriented in a sliding patio door), and such terms are not intended to limit the orientation with which the disclosed lock assembly may be utilized.

Figure 2:
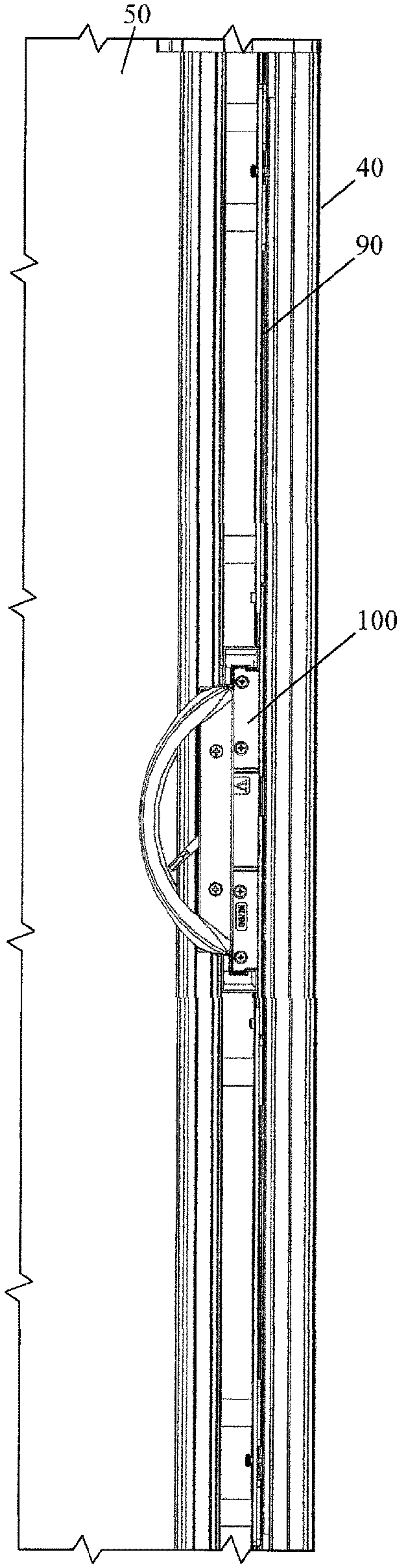
FIG. 2 is an enlarged detail view of the portion of the patio door and master frame of FIG. 1 that includes the keeper and lock assembly.
Figure 3:
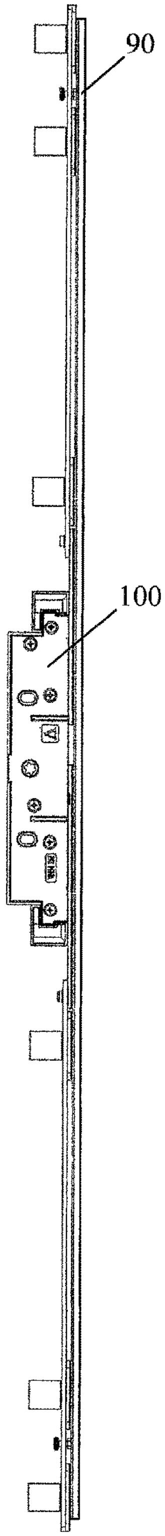
FIG. 3 is a side view showing the keeper and lock assembly of FIG. 1, being shown in a mated and locked position.
Figure 4:
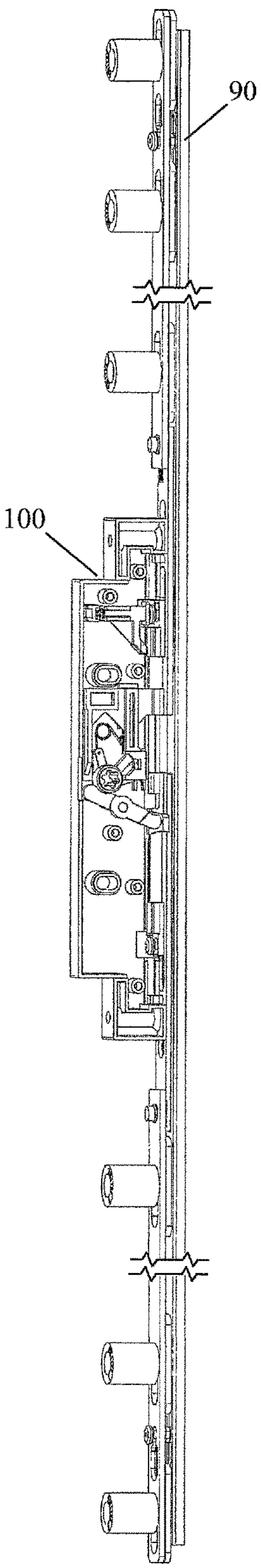
FIG. 4 is an enlarged perspective view showing the keeper and lock assembly of FIG. 1, being shown in a mated and locked position.
Figure 4A:
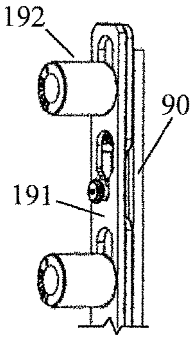
FIG. 4A shows one end of the keeper and lock assembly of FIG. 4 being further enlarged.

FIG. 1 is front view of a patio door 50 after being installed to slide in a master door frame 40, which arrangement includes a keeper assembly 90 installed on the master frame, and the full lock assembly 100 disclosed installed on the door assembly 50. FIG. 2 is an enlarged detail view of the portion of the patio door and master frame of FIG. 1 that includes the keeper 90 and the full lock assembly 100. FIG. 3 is a side view showing the keeper assembly 90 and the full lock assembly 100 of FIG. 1, with the two being shown in a mated and locked position. FIG. 4 is an enlarged perspective view showing the keeper 90 and the full lock assembly 100 of FIG. 1, being shown mated together and in a locked position. FIG. 4A shows one end of the keeper assembly 90 and the full lock assembly 100 as shown in FIG. 4, but being further enlarged. FIG. 5 is the side view of FIG. 3, but is shown with the keeper 90 disengaged from the full lock assembly 100 and separated therefrom. FIG. 6 is an exploded view of the component parts of the full lock assembly 100 of FIG. 5. FIG. 7 is an exploded view of the component parts of the keeper assembly 90 of FIG. 5.

As may be understood from FIG. 4A and FIG. 5, the keeper 90 may be formed to include an elongated plate 91, and a plurality of particularly shaped lock pins 92, a portion of which pins may protrude from one side of the elongated plate. The components of the keeper assembly 90 may be made of any suitable material or materials, including, but not limited to, stainless steel. As seen in FIG. 5A, each of the lock pins 92 may include a shaft portion 92S that may be cylindrical, and a head portion 92H. The head portion 92H may alternatively be box shaped or may be any other suitable shape, but for simplicity, it may be cylindrical in shape with its two edges at its ends being radiused, and is also larger in diameter than the shaft portion 92S. In one embodiment, the keeper may be formed to include two lock pins 92. In another embodiment, the keeper may be formed to include four lock pins 92. In other embodiments, different numbers of lock pins 92 may be used on the keeper 90, which need not be an even number of lock pins, and need not be a symmetrical arrangement of lock pins. The shaft portion 92S of the lock pins 92 may be formed on or be secured to the elongated plate 91 in any suitable manner.

An adjustable keeper assembly 90 is shown in FIG. 7A, FIG. 7B, FIG. 8, FIG. 8A, and FIG. 8B. As seen in those figures, the keeper assembly 90 may include: the keeper bar 91, one or more keeper base plates 95, and a nut 94, a lock pin 92, a jam nut 96, and a pair of joining fasteners for each base plate that is utilized.

The keeper bar 91 may be formed into a channel section having a length, and may be formed to have a base 91B, a first leg 91Li, and a second leg 91Lii (see FIG. 8), where the first leg and the second leg may each extend perpendicularly away from a respective side of the base. The keeper bar 91 may be formed with a plurality of sets of openings in the base 91B, one set being needed for each base plate 95 that is utilized in the keeper assembly 90.

The keeper base plate 95 may be formed into a rectangular shape that may also be elongated, and may be configured to nest within the channel section of the keeper bar 91, and be slidable therein. Each keeper base plate 95 may include: a central hole 95C, a first joining hole 95Ji, a second joining hole 95Jii, a first slotted securement hole 95Si, and a second slotted securement hole 95Sii. The central hole 95C may preferably be substantially centered with respect to a length 95L of the keeper base plate 95. The first and second joining holes 95Ji and 95Jii may be positioned on opposite sides of the central hole 95C. A center of the second slotted joining hole 95Jii may be spaced apart a first distance (L1) away from the center of the first joining hole 95Ji. The first and second slotted securement holes 95Si and 95Sii may be slotted in the length direction of the elongated keeper base plate 95, each having a slot length 95SSL, and may be positioned on opposite sides of the central hole 95C, with a center of the second slotted securement hole 95Sii being spaced a distance L2 away from the center of the first slotted securement hole 95Si. The first and second slotted securement holes 95Si and 95Sii may also be in a particular positional relation with respect to the spaced apart first and second joining holes 95Ji and 95Jii, and in one embodiment the positional relation may be that both sets of slotted holes are symmetrically positioned with respect to the central hole 95C. In other embodiments, other pre-determined positional relationships may alternatively be utilized, and which relationship would need to be matched by corresponding openings on the keeper bar 91, as described below.

Figure 7A:
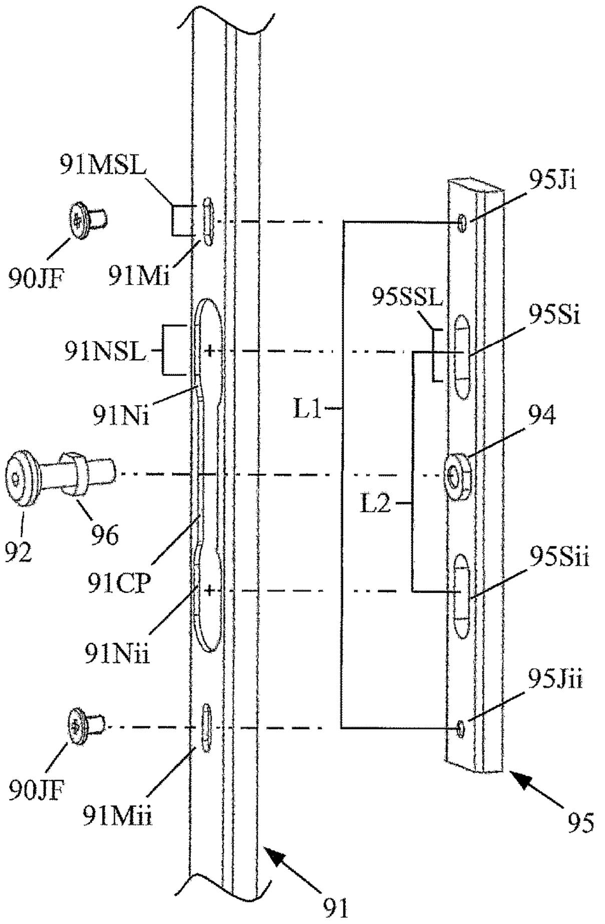
FIG. 7A is an enlarged detail showing only a portion of the component parts of the keeper assembly shown in FIG. 7.
Figure 8:
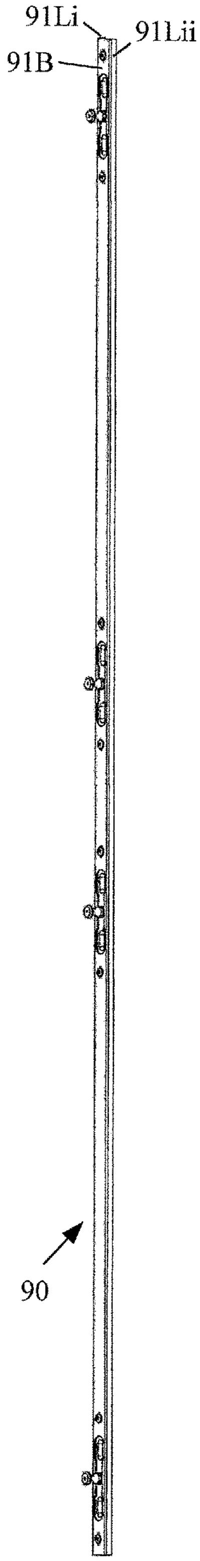
FIG. 8 is a perspective view of the component parts of FIG. 7, but are shown after being assembled.
Figure 8B:
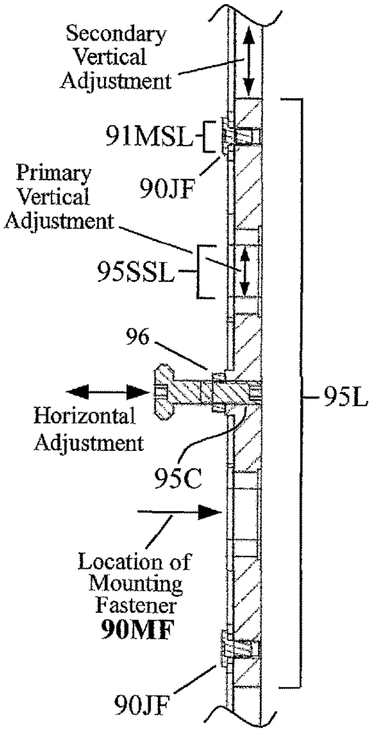
FIG. 8B is a cross-sectional view through a portion of the keeper assembly shown in FIG. 8.

The nut 94, as seen in FIG. 7A, may be fixedly secured to the keeper base plate 95, with the axis of the internal threading of the nut being positioned concentric with respect to the axis of the central hole 95C (see e.g., FIG. 8B).

Figure 7B:
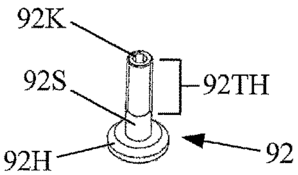
FIG. 7B is an enlarged of the lock pin shown in FIG. 7.

The lock pin 92, as seen in FIG. 7B, may include the shaft 92S where at least a portion of the shaft may have external threading 92TH, and may also include a head 92H, which may be cylindrical, with the distal ends of the cylinder being radiused or chamfered. The distal end of the shaft 92S and the distal top of the head 92H may each have a hexagonal socket 92K that may be configured to receive a hex tool usable to adjust the height of the lock pin in combination with a wrench being used on the jam nut 96, which jam nut is configured to threadably couple to the threading of the shaft 92S.

Each set of openings in the base 91B of the keeper bar 91 may include a a first slotted mating hole 91Mi, a second slotted mating hole 91Mii, a first slotted mounting hole 91Ni, a second slotted mounting hole 91Nii, and a central opening 91CP. The first and second slotted mating holes 91Mi and 91Mii may be slotted in a length direction of the keeper bar 91, each having a slot length 91MSL. A center of the second slotted mating hole 91Mii may be spaced apart from the center of the first slotted mating hole 91Mi the distance L1. The first and second slotted mounting holes 91Ni and 91Nii may also be slotted in the length direction of the keeper bar 91, each having a slot length 91NSL, and may be formed with a center of the second slotted mounting hole 91Nii being spaced apart from the first slotted mounting hole 91Ni the second distance (L2). Also, the spaced apart first and second slotted mounting holes 91Ni and 91Nii may have a positional relationship with respect to the spaced apart first and second slotted mating holes 91Mi and 91Mii that matches (i.e., is the same as) the particular positional relation used between the spaced apart first and second slotted securement holes 95Si and 95Sii and the spaced apart first and second joining holes 95Ji and 95Jii, which need not be an arrangement where they are respectively symmetric with respect to the central hole 95C.

Each set of openings in the base 91B of the keeper bar 91 may also include a slotted central opening 91CP, which may interconnect the first and second slotted mounting holes 91Ni and 91Nii. The slotted central opening 91CP may be sized to accommodate lateral sliding of the nut 94 (and even nut 96) therethrough in a clearance fit (see the arrows shown in FIG. 8A).

Each of the first and second slotted securement holes 95Si and 95Sii are configured to receive a respective mounting fastener 90MF (see FIG. 1E and FIG. 8B) to thereat secure at least a portion of the channel section to the master frame 40, and provide primary vertical adjustability for the entire keeper assembly 90 with respect to the master frame, with an amount of the vertical adjustability thereby provided corresponding to the length of the slot (i.e., the slot length 95SSL) that is used for each of the first and second slotted securement holes 95Si and 95Sii, which need not, but may preferably be, the same slot length for each of the first and second slotted mounting holes. Note that if a slot length smaller than length 95SSL is used for one of the first and second slotted securement holes 95Si and 95Sii, the smaller slot length would define the amount of primary vertical adjustability.

A pair of joining fasteners 90JF may be used for each of the openings 91Mi and 91Mii in the base 91B, for mounting of each keeper base plate 95 to the keeper bar 91. Each of the pair of joining fasteners 90JF are configured to be respectively received through first and second slotted mating holes 91Mi and 91Mii of the keeper bar 91, and respectively secure to the first and second joining holes of the keeper base plate, which joining holes may be threaded, to adjustably mount the keeper base plate to the keeper bar 91 to provide secondary vertical adjustability, being at each individual keeper base plate 95. The amount of this secondary vertical adjustability thereby provided is defined by the length of the slots (i.e., the slot length 91MSL) that is used for each of the first and second slotted mounting holes 91Ni and 91Nii. Note that if a slot length smaller than length 91MSL is used for one of the first and second slotted mounting holes 91Ni and 91Nii, the smaller slot length would define the amount of secondary vertical adjustability. Note that in one embodiment, the length of the first slotted securement hole 95Si is equal to the length of the second slotted securement hole 95Sii; the length of the first slotted mating hole 91Mi is equal to the length of the second slotted mating hole 91Mii; and the length of the first slotted mounting hole 91Ni is the same as a length of the second slotted mounting hole 91Nii.

Figure 1A:
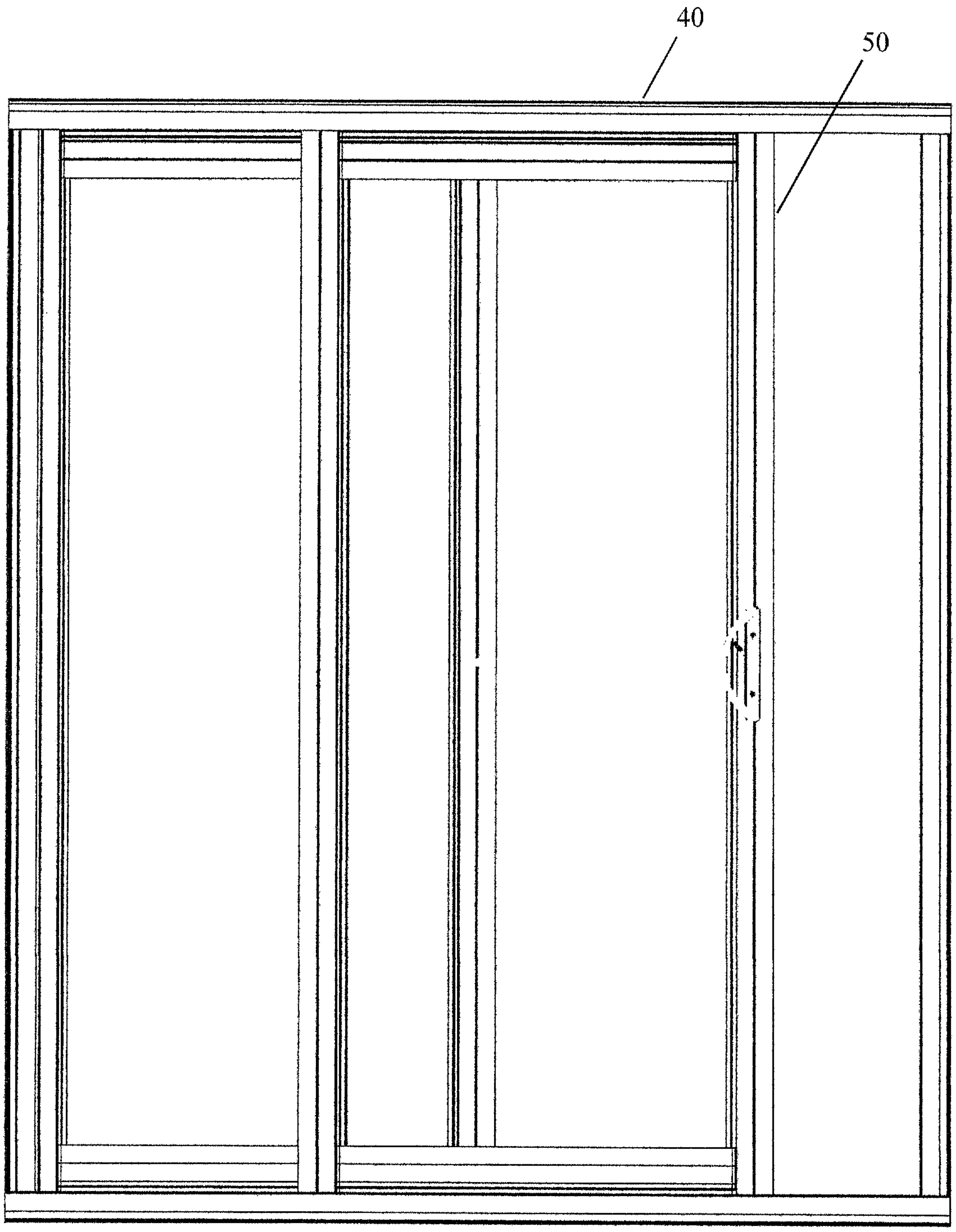
FIG. 1A is the front view of FIG. 1, but is shown after the door has been slid into an open position.
Figure 1B:
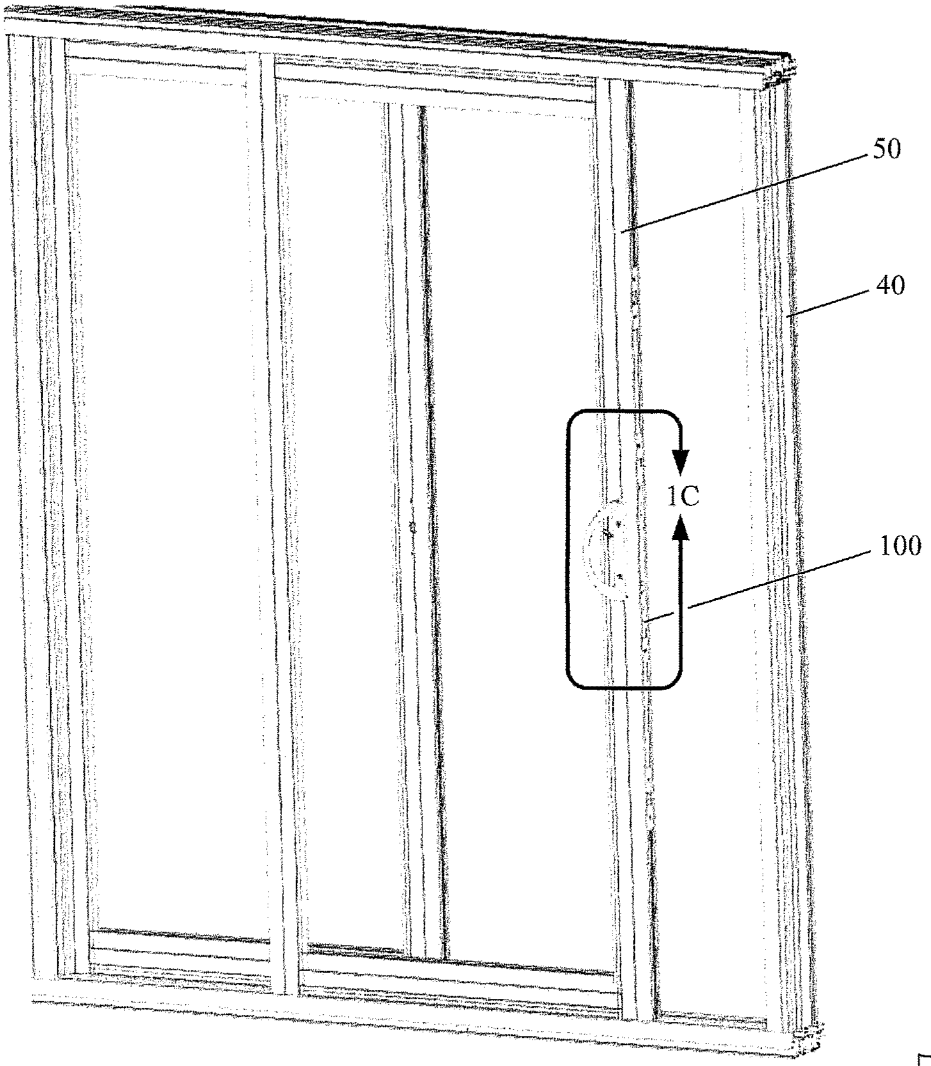
FIG. 1B is a first perspective view showing the door in the door open position of FIG. 1A, in which the exterior side of the lock assembly is visible.
Figure 1C:
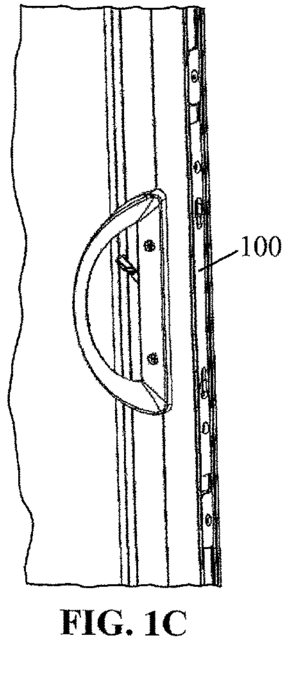
FIG. 1C is an enlarged detail view of the lock assembly in FIG. 1B.
Figure 1D:
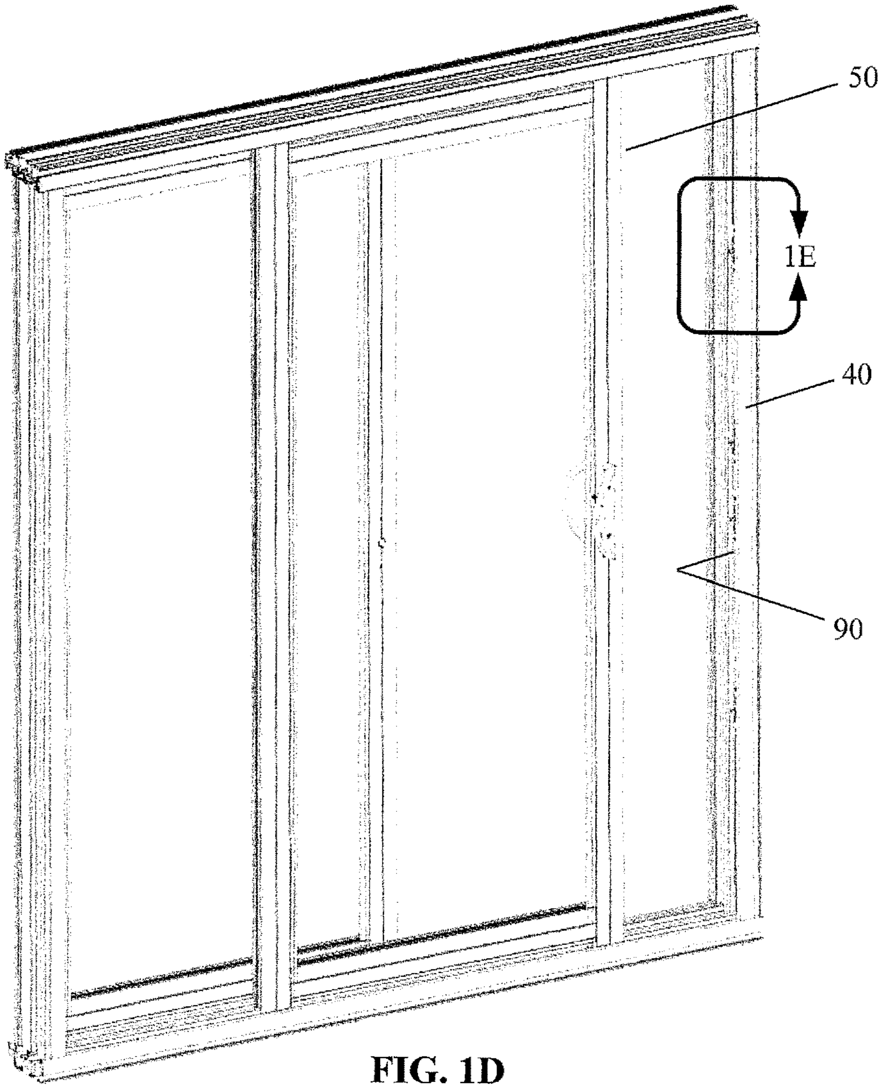
FIG. 1D is a second perspective view showing the door in the door open position of FIG. 1A, in which the exterior side of the keeper assembly is visible.
Figure 1E:
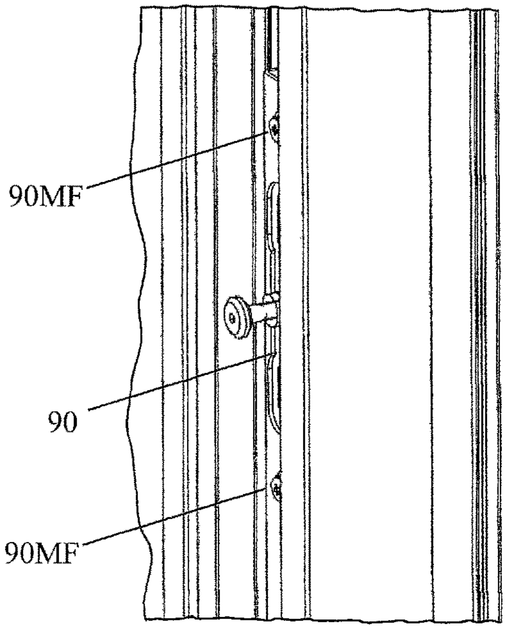
FIG. 1E is an enlarged detail view showing the keeper assembly as shown in FIG. 1D.

The amount of primary vertical adjustability for the entire keeper assembly 90 with respect to its position on the master frame 40, is the slot length 95SSL, as may be understood from FIG. 1D and FIG. 1E, which adjustability may be accomplished by loosening each of the mounting fasteners 90MF, and by sliding the keeper assembly 90 up or down as needed, and then re-tightening those mounting fasteners. Note that this presumes that those mounting fasteners 90MF were each initially installed at the same relative position within the the slot length 95SSL for each of the respective first and second slotted securement holes 95Si and 95Sii (e.g., at each theoretical center), otherwise the maximum sliding adjustment (slot length 95SSL) could be prevented, and moreover all of the sliding adjustment could be eliminated if, for example, one mounting fastener 90MF had been installed into the master frame 40 at the very top of one of the first slotted securement holes 95Si and the second mounting fastener 90MF had been installed into the master frame 40 at the very bottom of the second slotted securement hole 95Sii.

Figure 8A:
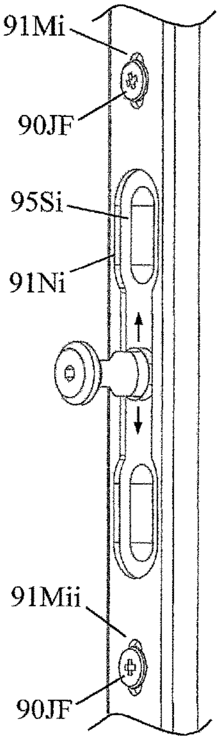
FIG. 8A is an enlarged detail view of portion of the keeper assembly shown in FIG. 8.

The amount of secondary vertical adjustability (i.e., slot length 91MSL) that may be utilized, as may be understood from FIG. 8A, may be accomplished by loosening each of the two joining fasteners 90JF for a particular keeper base plate 95, and by sliding that one single keeper base plate 95 up or down as needed, and then re-tightening those two joining fasteners 90JF. Vertical adjustment of a single keeper base plate 95 may be needed in certain instances, including, but not limited to, where a door/frame may be bowed or have an anomaly at one location. Of course, all of the keeper base plates 95 utilized on the keeper assembly 90 (e.g., four keeper base plates 95—see FIG. 8) may be individually and uniquely adjusted (some adjusted up and some adjusted down), or alternatively all four may be similarly adjusted (i.e., all adjusted the same, e.g., all adjusted upwardly).

Note that to be able to utilize the full amount of the secondary vertical adjustability provided by the slot length 91MSL, the slot length 91NSL of the first and second slotted mounting holes 91Ni and 91Nii must be larger than (oversized with respect to) the slot length 91SSL of the first and second slotted securement holes 95Si and 95Sii (see FIG. 8A), being oversized an amount being at least equal to the slot length 91MSL, to accommodate the movement of the first and second slotted securement holes 95Si and 95Sii.

Note that to adjust a position of the head 92H of the lock pin 92 (i.e., a distance that it is positioned away from the base 91B of the keeper bar 91), the jam nut 96 my be loosened, and the shaft 92S of the lock pin may be rotated in the appropriate direction (moving the head closer to or farther away from the base 91B of the keeper bar 91), and when the head 92H is adjusted to be positioned as needed, the jam nut 96 may be re-tightened into contact with the nut 94.

A piece of double-sided adhesive tape 97 (e.g., a double-sided adhesive foam tape that may have different amount of tackiness on the two sides) may be utilized on the keeper 90 for installation of the keeper assembly 90 on the master frame 40. During this installation process, the keeper assembly 90 may be locked with respect to the full lock assembly 100 prior to its installation on the door 50, and once installed, the door may be slid closed, so that the double sided tape may temporarily attach the keeper assembly 90 to the master frame 40 at the correct installation location. The full lock assembly 100 may be unlocked with respect to the keeper assembly 90, and the door 50 may be slid open, leaving the keeper assembly adhered in place on the master frame, because of the higher tackiness, so that fasteners may be installed to fixedly secure the keeper assembly to the master frame 40, as seen in FIG. 1E.

Figure 9:
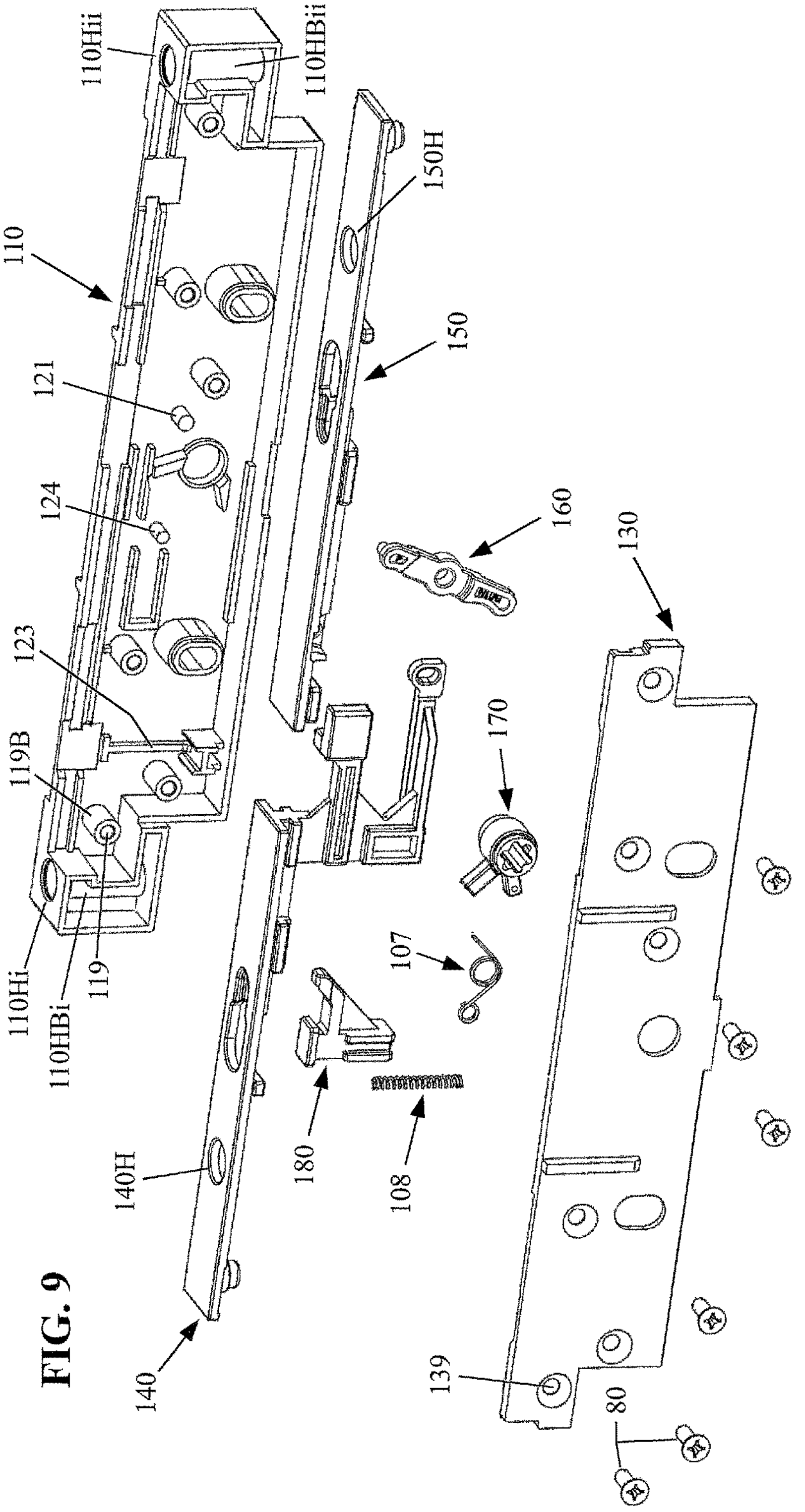
FIG. 9 is an exploded view of the component parts of just the lock box assembly of FIG. 5 and not the component parts used to form the first and second locking bar assemblies, being shown enlarged.
Figure 9A:
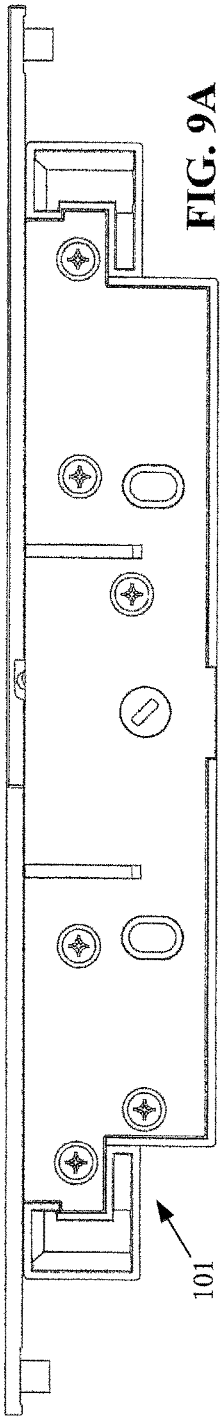
FIG. 9A shows the component parts of FIG. 9 after being assembled into the lock box assembly.
Figure 18:
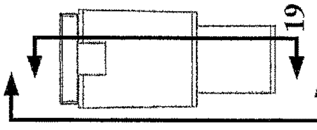
FIG. 18 is an end view of the lock box assembly of FIG. 17.
Figure 17:
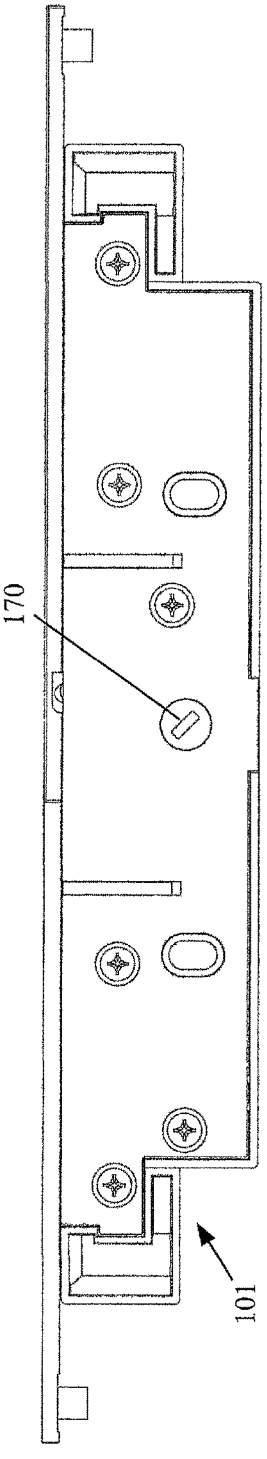
FIG. 17 is a side view of the lock box assembly of FIG. 9A.

FIG. 9 is an exploded view showing the component parts of FIG. 6 that are used to form the lock box assembly 101 of FIG. 9A (and also FIGS. 17-18), which, along with the first and second locking bar assemblies that may be secured thereto, altogether form the full lock assembly 100 of FIG. 5.

As seen in FIG. 9, the lock box assembly 101 may include a housing 110, a cover member 130, a first locking member 140, a second locking member 150, a rocker arm 160, and a driving member 170. The components of the lock box assembly 101 may be made of any suitable material or materials, including, but not limited to, zinc dichromate.

Figure 10A:
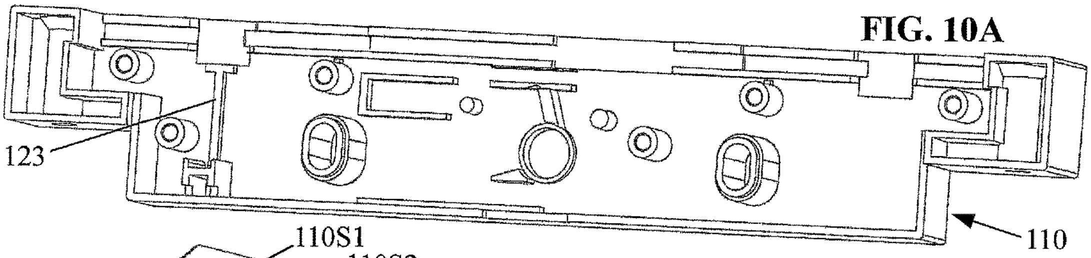
FIG. 10A and FIG. 10B are first and second perspective views of the housing of the lock box assembly of FIG. 9A.
Figure 10B:
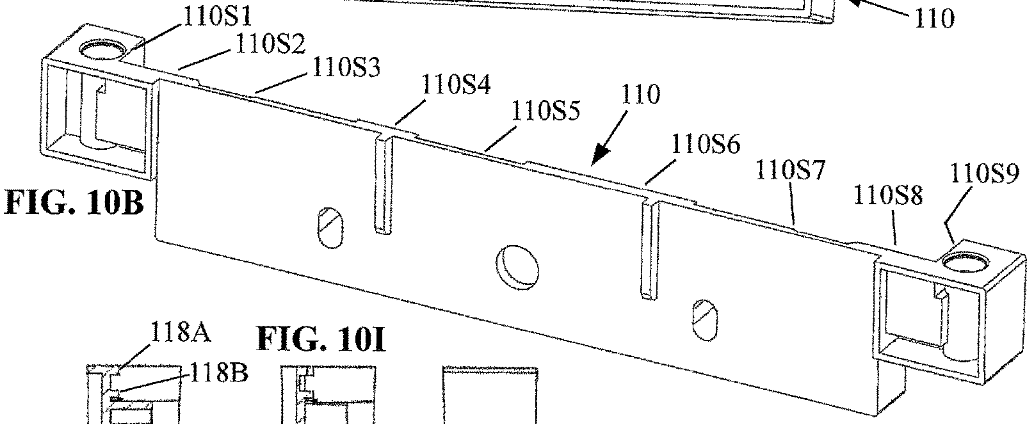
Figure 10G:
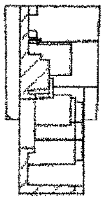
FIG. 10G, FIG. 10H, and FIG. 10I are section cuts taken at different positions along the length of the housing as indicated in FIG. 10D.
Figure 10H:
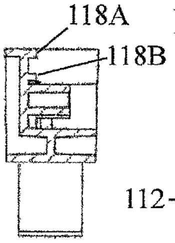
Figure 10I:
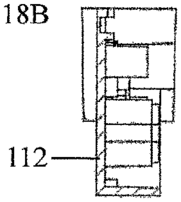
Figure 10J:
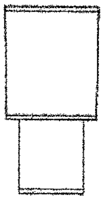
FIG. 10J is an end view of the housing as indicated in FIG. 10D.
Figure 10C:
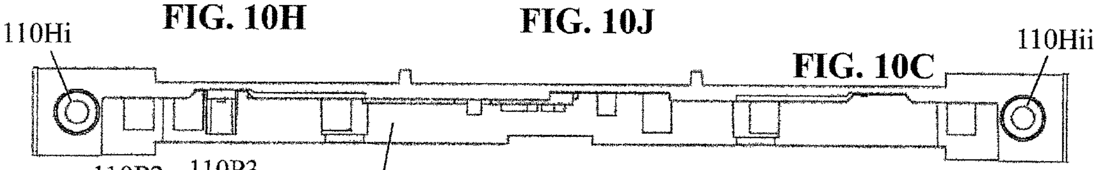
FIG. 10C, FIG. 10D, FIG. 10E, and FIG. 10F are a bottom view, a first side view, a top view, and a second side view of the housing of FIG. 10A.
Figure 10D:
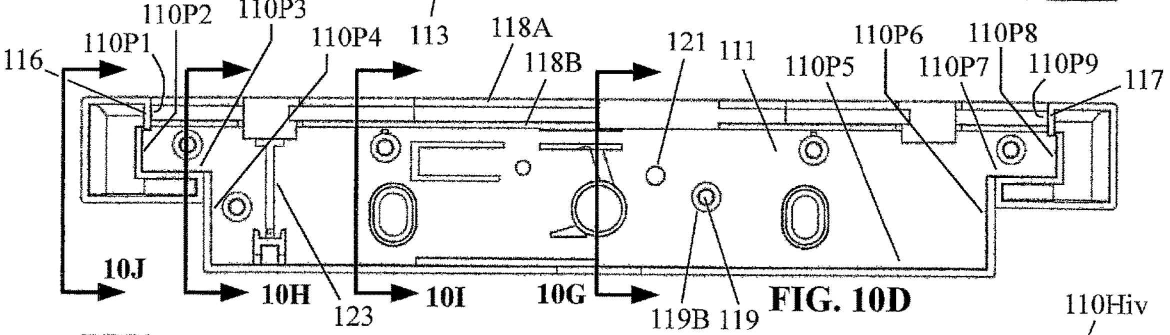
Figure 10E:
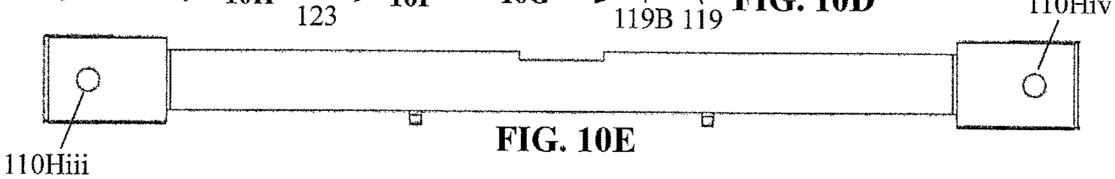
Figure 10F:
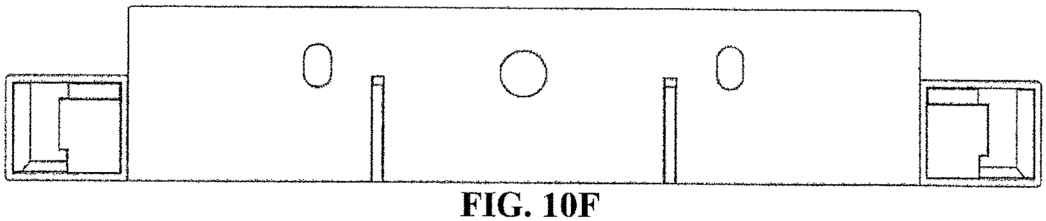
Figure 16A:
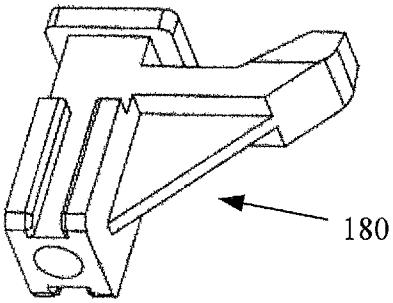
FIG. 16A, FIG. 16B, FIG. 16C, and FIG. 16D are first, second, third, and fourth perspective views of the safety button of the lock box assembly of FIG. 9A.
Figure 16B:
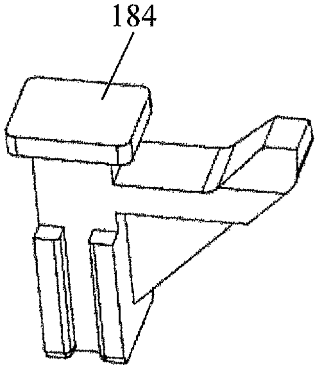
Figure 16C:
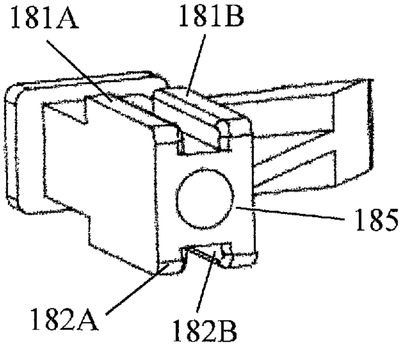
Figure 16D:
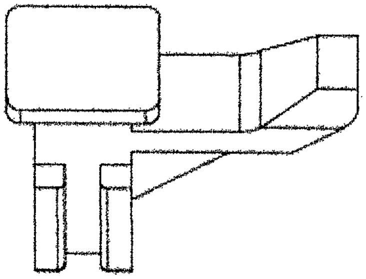
Figure 16G:
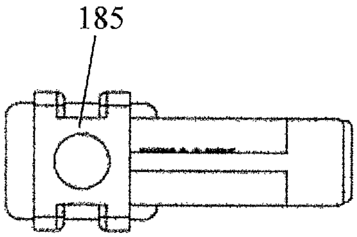
FIG. 16G is a bottom view of the safety button of FIG. 16E.
Figure 16F:
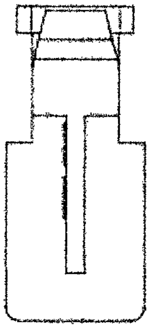
FIG. 16F is a rear view of the safety button of FIG. 16E.
Figure 16E:
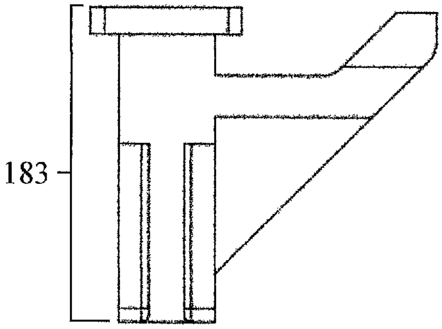
FIG. 16E is a side view of the safety button of FIG. 16A.
Figure 16H:
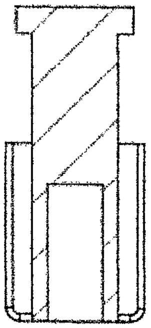
FIG. 16H is a cross-section through the safety button of FIG. 16E.

The housing 110 is shown in detail in FIGS. 10A-10J, and may be formed to have a main opening on a first side, as seen in FIG. 10A and FIG. 10D, which opening may have edges 110P1, 110P2, 110P3, 110P4, 110P5, 110P6, 110P7, 110P8, and 110P9 (note that apart from the sculpted interior features, there alternatively could be just three edges defining the opening). The housing 110 may alternatively be formed to be generally box shaped and still operate substantially the same. The main opening may define an interior surface 111 forming a portion of a housing cavity. A second opening formed on a central portion of an adjacent side, as seen in FIG. 10C, may have edges 110S1, 110S2, 110S3, 110S4, 110S5, 110S6, 110S7, 110S8, and 110S9, which second opening interconnects with the housing cavity, thereby forming at least a rear wall 112, a bottom wall 113, a first side wall 114, and a second side wall 115. To accommodate a particular scheme for attachment to the door 50, the housing 110 may also be formed to include some joggles that may also create a first upper side wall portion 116, and a second upper side wall portion 117. Also, holes 110Hi, 110Hii, 110Hiii, and 110Hiv may be used to facilitate attachment of the lock box assembly 101 to the door 50 (see FIG. 10C and FIG. 10E) which pairs of holes may transition into a respective boss 110HBi and 110HBii to prevent clamp-up damage to those flanges (FIG. 9), and the opening 140H on the first locking member 140 (FIG. 12G) and the opening 150H on the second locking member 150 (FIG. 13F) may also facilitate attachment of the lock box assembly 101 to the door 50. Note that the fasteners used for attachment of the lock box assembly 101 to the door 50 would merely pass through the openings 140H and 150H on the locking members 140 and 150 during installation of those fasteners, and not interact therewith, as may be seen in FIG. 1C, resulting in the heads of those fasteners applying a force between the housing 110 and the frame of the door 50, with the heads of those fasteners being recessed (not protruding from the mortise), and therefore not being visible when looking at the opened door head-on, as seen in FIG. 1A.

The rear wall 112 of housing 110 may be formed to include a first flange 118A and a second flange 118B, that are parallel, and which form a track. The first flange 118A and second flange 118B may be interrupted by openings at a plurality of locations that may accommodate other features and operations of the lock box assembly 101. The first flange 118A and second flange 118B may be centrally positioned, being formed between the first upper side wall portion 116 and the second upper side wall portion 117.

Figure 26:
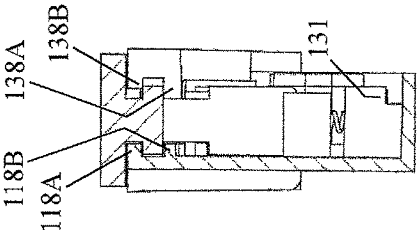

The cover member 130 is shown in detail in FIGS. 11A-11K, and may also be formed with a first flange 138A and a second flange 138B that are parallel, and which are also configured to form a track. When the cover member 130 is secured to the housing 110, the track of the cover member (flanges 138A and 138B) is aligned with the track of the housing (with flanges 118A and 118B)—see e.g., FIG. 26. In one embodiment the cover member 130 may be particularly shaped to match the entire profile shape of the housing 110, and in another embodiment, the cover member 130 may instead be formed with a shape that is configured to principally enclose the main opening of the housing (see FIG. 9), when the cover member is secured to the housing, and may include a peripheral flange 131 that may nest within the main opening of the housing (see FIG. 19), and a portion of peripheral flange 131 may rest upon the bottom wall 113 of the housing (see e.g., FIG. 26).

The cover member 130 may be secured to the housing using any joining method known in the art, including, but not limited to, using mechanical fasteners (e.g., screws, bolts and nuts, etc.), adhesive, a friction fit, welding techniques, hook and loop fastening materials sold under the trademark VELCRO®, etc. As seen in FIG. 9 and FIG. 11C, the cover member 130 may be formed to include a plurality (e.g., six) holes 139, each of which locations may also have a concentric boss 139B formed therewith, which may accommodate screws or bolts 80 that may be received in corresponding openings 119 in the housing 110 (FIG. 10D), each of which may also be supported by a boss 119B. Each boss

139B of the cover member 130 may contact the corresponding boss 119B of the housing 110, when the cover member is secured to the housing.

The first locking member 140 is shown in detail in FIGS. 12A-12J. The first locking member 140 may be formed to include a main flange 141 that may have an elongated opening having a first opening portion 141Pi with a first width, and a second opening portion 141Pii with a second width, where the first width is greater than said second width. The larger first width of the first opening portion 141Pi is configured to permit sliding therethrough of the head portion 92H of a lock pin of the keeper 90, while the narrower second width of the second opening portion 141Pii is configured to engage with (e.g., to surround and be adjacent to) the cylindrical shaft portion 92S of the lock pin, while also preventing the larger diameter of the head portion 92H from passing through the narrower second portion of the elongated opening, which may thereby serve to inhibit sliding of the door and thereby lock the door 50, as described hereinafter. The first locking member 140 may also be formed to include a protrusion 142 that protrudes from a first side of the main flange, the protrusion includes one or more first slider members and one or more second slider members. The first and second slider members may protrude in a first lateral direction and a second lateral direction, respectively, being lateral with respect to an axial direction 140X of the main flange 141. The first and second slider members may be interrupted, and may thus be configured to protrude from the protrusion 142 to create a pair of first slider members 143*i* and 143*ii*, and a pair of second slider members 144*i* and 144*ii*. The pair of first slider members 143*i* and 143*ii* and the pair of second slider members 144*i* and 144*ii* are configured to be slidably received in a first portion of the track in the housing 110 formed by flanges 118A and 118B, and a first portion of the track in the cover member 130 formed by flanges 138A and 138B, respectively. Additionally, for more stability with respect to the first locking member 140 being able to slide in the track of the housing 110 and the track of the cover member 130, the first locking member may include an additional protrusion 142*i*, from which may protrude a tertiary set of first and second slider members 143*iii* and 144*iii*. The first locking member 140 may also be formed to include a transverse flange 145, from which may extend an axial protrusion 146 that may include first and second cam following surfaces 147*i* and 147*ii*, third and fourth cam following surfaces 147*iii* and 147*iv*, and apex cam following surfaces 147Ai and 147Aii. Another axial protrusion 148 may extend away from the transverse flange 145, and may be formed with a hole 149. Note that axial protrusions 146 and 148 may both extend away from the transverse flange 145 to be substantially parallel to the main flange 141.

The second locking member 150 is similarly formed with a main flange 151 that may have an elongated opening having a first opening portion 151Pi with a first width, and a second opening portion 151Pii with a second width, where the first width is greater than said second width, to respectively admit passage and block sliding passage of the head portion 92H of a lock pin 92 of the keeper 90.

The second locking member 150 may also be similarly formed to include a protrusion 152 that may protrude from a first side of the main flange 151, and which may include a pair of first slider members 153*i* and 153*ii*, and a pair of second slider members 154*i* and 154*ii*. The pair of first slider members 153*i* and 153*ii* and the pair of second slider members 154*i* and 154*ii* are also configured to be slidably received in a first portion of the track in the housing 110 formed by flanges 118A and 118B, and a first portion of the track in the cover member 130 formed by flanges 138A and 138B, respectively. The first and second slider members may protrude in a first lateral direction and a second lateral direction, respectively, being lateral with respect to an axial direction 150X of the main flange 151.

The rocker arm 160 is formed with a hub 163, a first arm 161 configured to extend from a first portion of the hub, and a second arm 162 configured to extend from a second portion of the hub. The hub 163 of the rocker arm 160 has a hole 163H that is pivotally mounted to a protrusion 121 on the housing 110 (see e.g., FIG. 9 and FIG. 19), while a cylindrical protrusion 161P on the first arm 161 is pivotally coupled to the opening 159 in the second locking member 150 (see FIG. 13E and FIG. 19), and a cylindrical protrusion 162P on the second arm 162 is pivotally coupled to the opening 149 on the first locking member 140 (see FIG. 12D and FIG. 19), thereby coupling sliding movement of the second locking member to the first locking member, such that they will move in opposite sliding directions.

The driving member 170 is is formed with a hub 173, a first cylindrical protrusion 171 configured to protrude from a first side of the hub, and a second cylindrical protrusion 172 configured to protrude from a second side of the hub. The first cylindrical protrusion 171 of the driving member 170 is also pivotally mounted to the housing 110 using hole 122, and the second cylindrical protrusion 172 is pivotally mounted to the cover member 130 using hole 132. The hub 173 includes a keyway 176 that is configured to be actuated using a key (i.e., to be rotated by a user), to move the components of the lock box assembly 101 between an unlocked position (FIG. 27 and FIG. 28) and a locked position (FIG. 32). The driving member 170 includes a first arm 174 that may act as a cam, and may include a first side surface 174*i*, a second side surface 174*ii*, a forced entry resistant surface 174FE, a first apex 174Ai, and a second apex 174Aii. The driving member 170 also includes a second arm 175 with a hole 175H, to which a torsion spring 107 may be coupled.

Figure 17A:
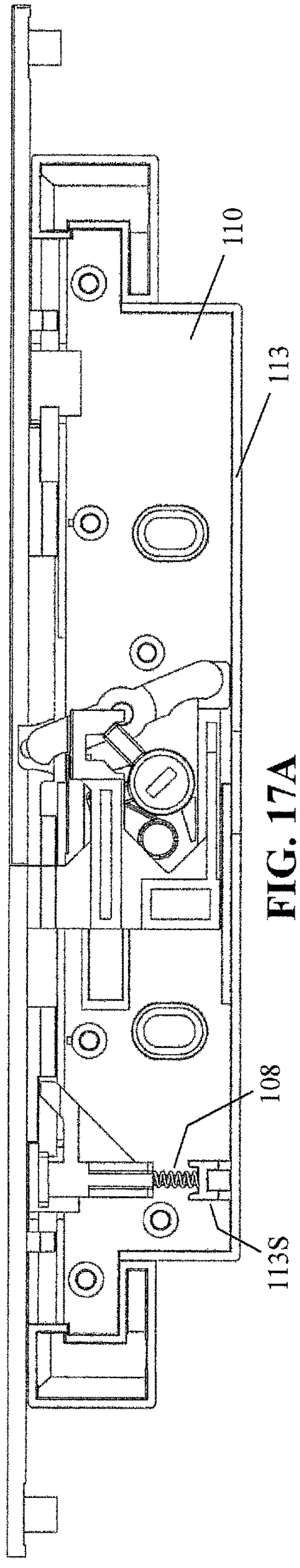
FIG. 17A is the view of FIG. 17, but is shown without the cover and is also shown slightly enlarged.
Figure 19:
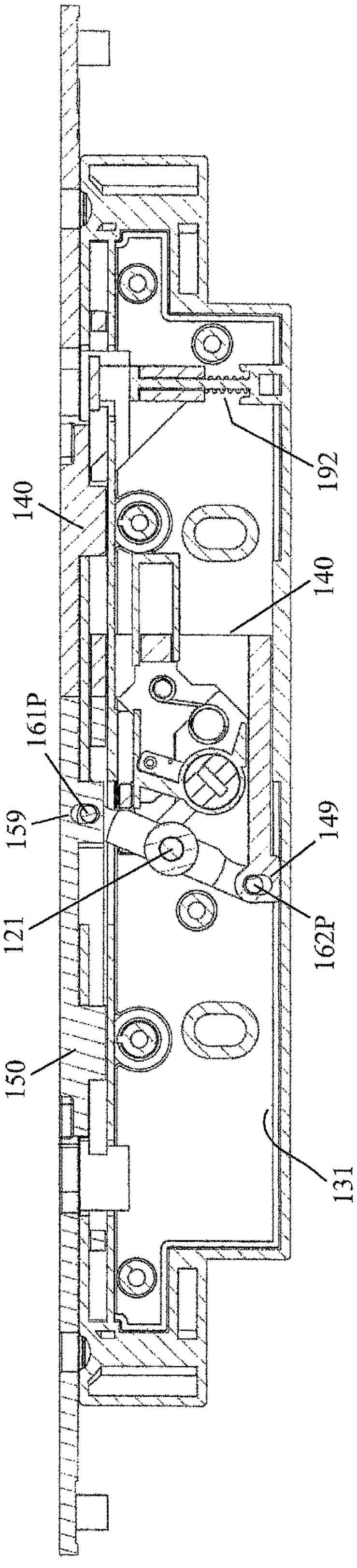
FIG. 19 is a cross-sectional view taken through the lock box assembly of FIG. 18.
Figure 17B:
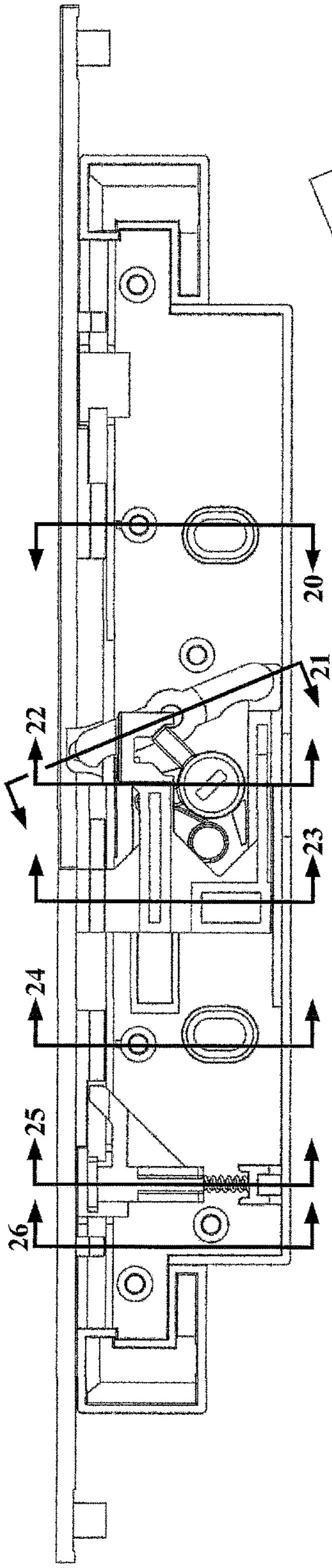
FIG. 17B is the same view as seen in FIG. 17A, but is shown on a different drawing sheet to identify section cut locations.
Figure 21:
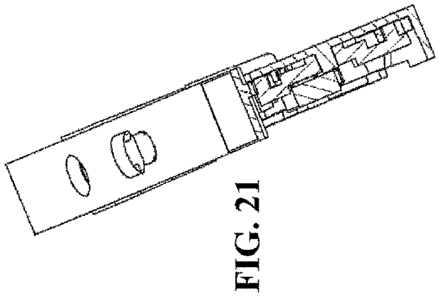
FIG. 20, FIG. 21, FIG. 22, FIG. 23, FIG. 24, FIG. 25, and FIG. 26 are section cuts taken through the lock box assembly, as indicated in FIG. 17B.
Figure 20:
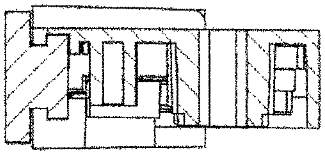
Figure 22:
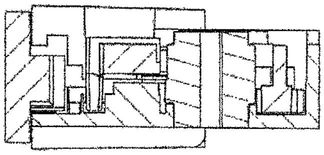
Figure 23:
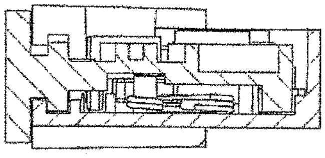
Figure 24:
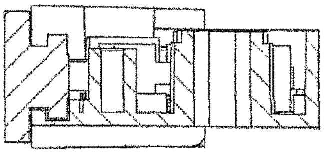
Figure 25:
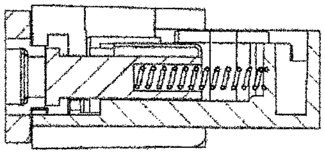

The lock box assembly 101 is shown in FIG. 17A and FIG. 19, and section cuts through the lock assembly are shown in FIGS. 20-26, with the section cut locations indicated in FIG. 17B.

The operation of the lock box assembly 101 is illustrated in the sequence of images shown in FIG. 27, FIG. 28, FIG. 29, FIG. 30, FIG. 31, and FIG. 32.

In FIG. 32 the lock box assembly 101 in shown in a locked, forced-entry resistant condition.

In FIG. 28 the lock box assembly 101 is shown in an unlocked condition, with the door closed.

In FIG. 27, the lock box assembly 101 is shown in an unlocked condition, with the door opened.

Figure 39:
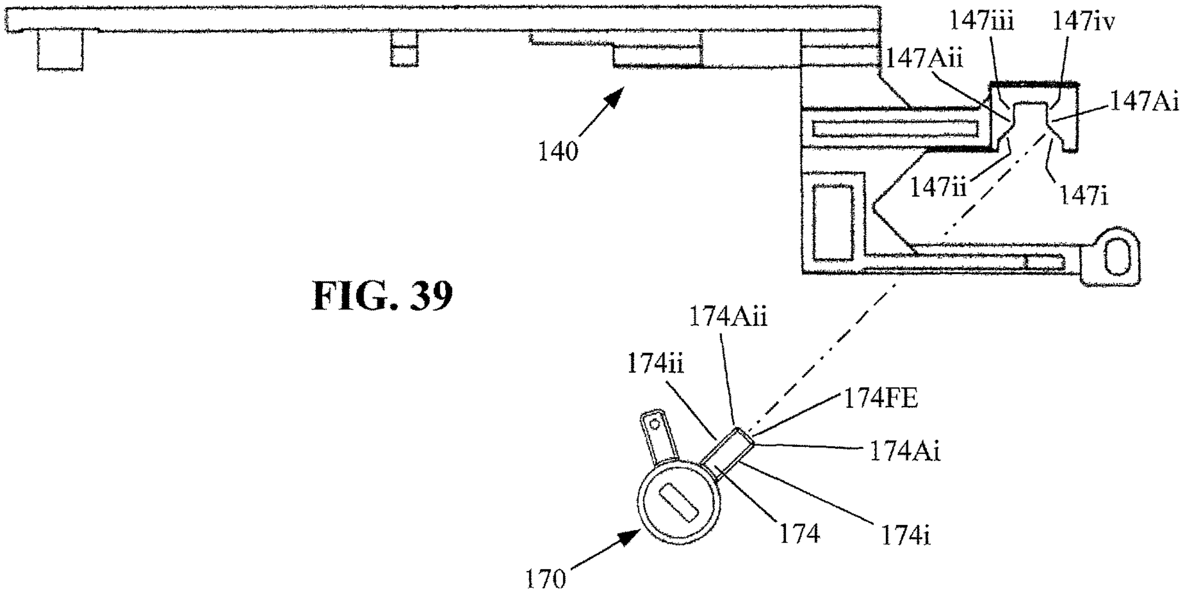
FIG. 39 is an exploded view showing just the driving member of FIG. 14D and the first locking member of FIG. 12D, identifying each of the respective engagement surfaces.

For unlocking of the lock box assembly 101, see generally the sequence of images in going from FIG. 32 to FIG. 27, and see also FIG. 39.

Figure 38:
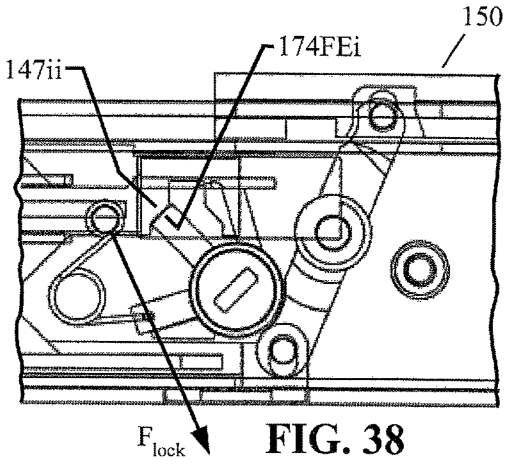
FIG. 38 is an enlarged detail view of a portion of the lock box as seen in FIG. 32.
Figure 38A:
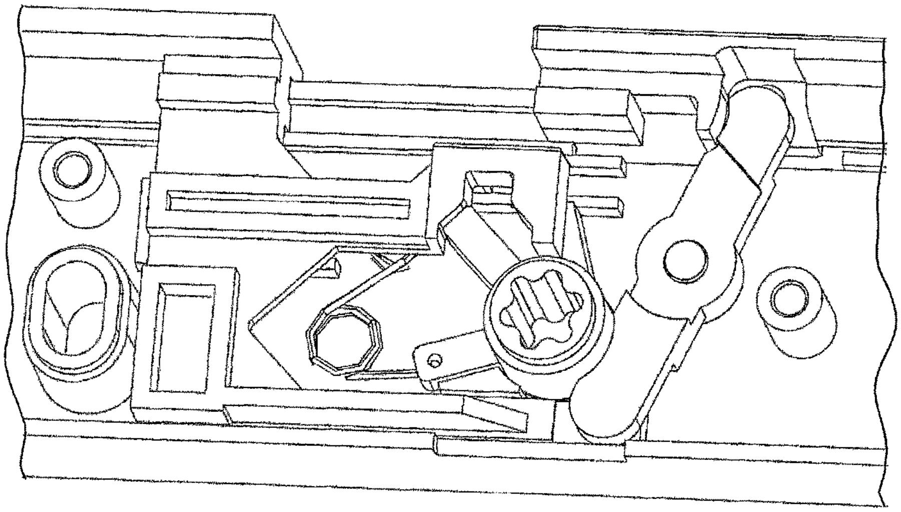
FIG. 38A is an enlarged perspective view of the lock box as seen in FIG. 38.

As may be understood from those figures, when the driving member 170 is initially rotated by the user from a first rotation position, being for the locked condition shown in FIG. 32 (and FIG. 38), toward a second rotation position (the unlocked condition shown in FIG. 28 and FIG. 34), after a period of independent rotation, the first cam surface 174*i* on first arm 174 initially contacts the apex cam following surface 147Ai of the first locking member 140 and thereby initially drives the first locking member 140 to slide in a first unlock direction (i.e., to the right as seen in FIG. 32 and FIG. 38), which correspondingly causes the second locking member 150 to be driven by the connections with the rocker arm 160 to slide in a second unlock direction (being a direction opposite to the first unlock direction, i.e., to the left as seen in FIG. 32). Continued rotation of the driving member 170 subsequently results in its first apex 174Ai contacting the fourth cam following surface 147*iv* of the first locking member 140, thereby driving the first locking member to further slide in a first unlock direction (i.e., to the right as seen in FIG. 32), and correspondingly causes the second locking member 150 to be further driven in a second unlock direction (to the left as seen in FIG. 32) by the connections with the rocker arm 160. Such movement causes the first opening portion 141Pi having the larger width in the first locking member 140 to become substantially aligned with a first lock pin 92*i* on the keeper (see FIG. 29) and also causes the first opening portion 151Pi having the larger width in the second locking member 150 to align with a second lock pin 92*ii* on the keeper 90 (FIG. 28 and FIG. 28A), to unlock the lock box assembly 101 permitting the lock assembly secured to the door/window to slide away from the keeper into a door open position as seen in FIG. 27. In addition, a small amount of continued rotation of the driving member 170 subsequently results in its forced entry resistant surface 174FE becoming aligned with (e.g., being substantially parallel to, and possibly even being in contact with) the first cam following surface 147*i* of the first locking member 140 (FIG. 27), thereby preventing an outside force that may be applied by an intruder to either the first or second locking members 140/150 from forcibly unlocking the lock box assembly 101 thereby preventing unauthorized entry into a dwelling. The lock box assembly 101, once locked, can only be unlocked through the reverse process described hereinafter.

It is first noted that the lock box assembly 101 may also include a safety button 180 that is designed to prevent a user from locking the lock box assembly 101 once it has been unlocked and the door 50 has been slid into a door open position (FIG. 27), because otherwise sliding (or slamming) of the door shut with the lock box assembly 101 in the locked position would cause damage (e.g., permanent deformation) of portions of the lock assembly (e.g., the first and second locking members 140/150), as a result of the head portion 92H of the lock pins of the keeper being driven (forced) into abrupt contact with the second (narrower) opening portions 141Pii and 151Pii of the first and second actuation members 140 and 150. As seen in FIGS. 16A-16H, the safety button 180 may have an elongated body 183 that may include a first pair of rails 181A and 181B on a first side, and a second pair of rails 182A and 182B on a second side. A distal end of the body 183 may terminate in a bearing surface 184. A proximal end of the body 183 may have an opening 185 (e.g., a hole) that may receive a portion of a compression spring 108. The first pair of rails 181A and 181B and the second pair of rails 182A and 182B of the safety button 180 may be respectively mounted on the track 123 in the housing 110 (see e.g., FIG. 9) and the track 133 of the cover member 130 (see e.g., FIG. 11E). As may be seen in FIG. 17A, when the the safety button 180 is slidably installed in the housing 110, a first end of the spring 108 may be received in its opening 185 and a second end of the spring may bear against the bottom wall 113 of the housing or may bear against a stand 113S, to bias the safety button away from a depressed position (e.g., FIG. 30) towards an extended position, which biased movement may be limited by a stop on the housing, whereat the bearing surface 184 of the button may be proximate to the larger opening portion 141Pi in the first locking member 140, as may be seen in FIG. 27. Being so biased into that extended position, a side of the body 183 of the safety button 180 would block sliding movement of the first locking member 140, which thereby also prevents sliding movement of the second locking member 150, because of the connection therebetween that is provided by the rocker arm 160.

When the door 50 is in a door open position (FIG. 27), use of the safety button 180 in the lock box assembly 101 prevents locking of the lock box assembly 101, but when the door is then slid towards the closed door position (e.g., FIG. 28), the lock pins 92*i* and 92*ii* of the keeper 90 are respectively received through the larger opening portion 141Pi in the first locking member 140 and the larger opening portion 151Pi in the second locking member 150, and the the lock pin 92*i* contacts the bearing surface 184 of the safety button 180 and drives the safety button from the extended button position (FIG. 27) to the depressed button position (FIG. 28), thereafter permitting movement of the first locking member 140 and thus also the second locking member 150. The second lock pin 92*ii* of the keeper 90 merely passes through the larger opening portion 151Pi in the second locking member 150.

Figure 34:
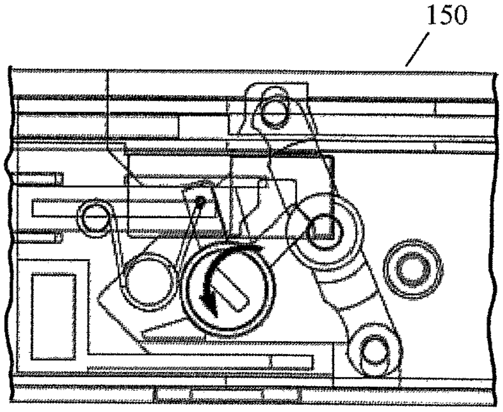
FIG. 34 is an enlarged detail view of a portion of the lock box as seen in FIG. 28.
Figure 35:
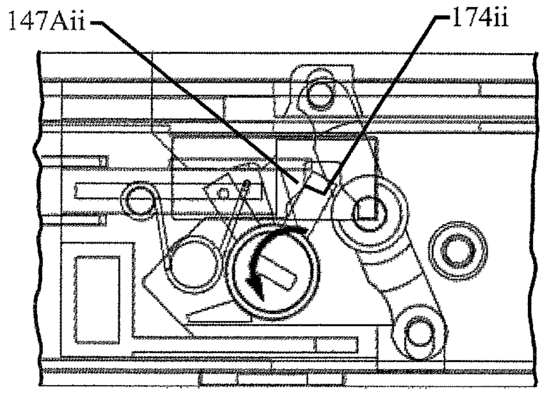
FIG. 35 is an enlarged detail view of a portion of the lock box as seen in FIG. 29.
Figure 36:
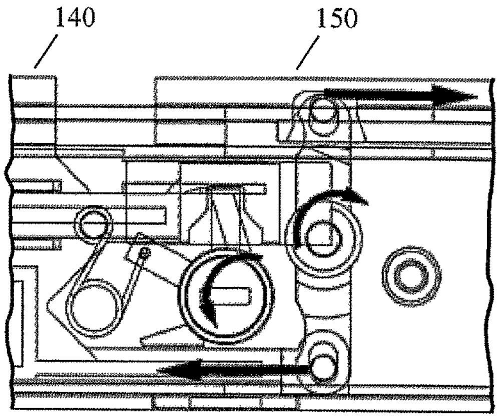
FIG. 36 is an enlarged detail view of a portion of the lock box as seen in FIG. 30.
Figure 37:
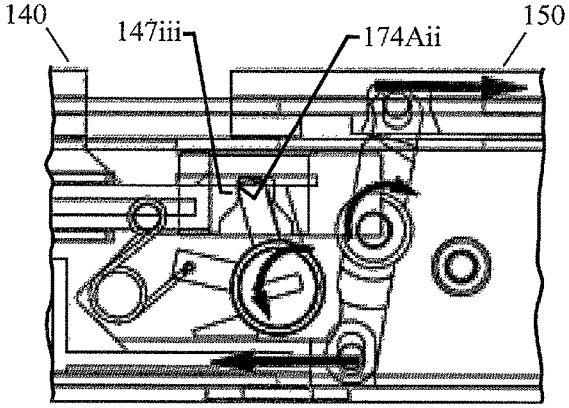
FIG. 37 is an enlarged detail view of a portion of the lock box as seen in FIG. 31.

For locking of the lock box assembly 101, as shown in the sequence of images in FIG. 27 to FIG. 32, when the lock assembly is in the unlocked position with the door closed, as shown in FIG. 28, and when the driving member 170 is initially counter-rotated as indicated by the rotation arrow shown in FIG. 28 (i.e., being rotated in the opposite direction by the user as for locking) from the second rotation position toward the first rotation position (FIG. 32), the forced entry resistant surface 174FE of the driving member moves away from proximity/contact with the first cam following surface 147*i* (FIG. 28 and FIG. 34), and after a period of independent rotation, a second cam surface 174*ii* on the first arm 174 contacts the apex cam following surface 147Aii of the first locking member 140 and thereby initially drives the first locking member 140 to slide in a first lock direction (i.e., to the left as seen in FIG. 29 and FIG. 35), which correspondingly causes the second locking member 150 to be driven by the connections with the rocker arm 160 to slide in a second lock direction (being a direction opposite to the first unlock direction, i.e., to the right as seen in FIGS. 28 and 34). Continued counter-rotation of the the driving member 170 subsequently results in its second apex 174Aii contacting the third cam following surface 147*iii* of the first locking member 140 (FIG. 31 and FIG. 37), thereby driving the first locking member to further slide in a first lock direction (i.e., to the left), and correspondingly causes the second locking member 150 to be further driven in a second lock direction (to the right) by the connections with the rocker arm 160. Such movement causes the second opening portion 141Pii having the narrower width in the first locking member 140 to just underly the head of a first lock pin 92*i* on the keeper and also causes the second opening portion 151Pii having the narrower width in the second locking member 150 to just underly the head of a second lock pin 92*ii* on the keeper 90, to lock the lock box assembly 101 (FIG. 31 and FIG. 37), which would prevent door/window 50 from sliding away from the keeper into a door open position. In addition, a small additional amount of continued counter-rotation of the driving member 170 subsequently results in its forced entry resistant surface 174FE becoming aligned with (e.g., being substantially parallel to, and possibly even being in contact with) the second cam following surface 147*ii* of the first locking member 140 (FIG. 32 and FIG. 38), thereby preventing an outside force that may be applied by an intruder to either the first or second locking members 140/150 from forcibly unlocking the lock box assembly 101 thereby preventing unauthorized entry into a dwelling. The lock box assembly 101, once locked, can only be unlocked through the reverse process described hereinafter. That small additional amount of continued counter-rotation of the the driving member 170 also results in the second opening portion 141Pii having the narrower width in the first locking member 140 further advancing and more completely underly the head of the first lock pin 92*i* on the keeper and also causes the second opening portion 151Pii having the narrower width in the second locking member 150 to also further advance and more completely underly the head of a second lock pin 92*ii* on the keeper 90 (FIG. 32 and FIG. 32A), when the lock box assembly 101 is locked in the forced-entry resistant locked position.

Note that the distance $D_{unlock}$ between the distal ends of the first locking member 140 and the second locking member 150 in FIG. 28 is smaller than the distance $D_{lock}$ between the distal ends of the first locking member 140 and the second locking member 150 in FIG. 32. As such, the first and second locking members 140 and 150 move in opposite directions during the locking process, and not only do the respective key-way-shaped openings (141Pi/141Pii and 151Pi/151Pii) operate to draw the door 50 towards the locking pins 92 (without the use of hooks utilized by other prior art lock arrangements), because of their configuration and the radiused shape of the heads of the locking pins 92, but also create an anti-lift feature as they serve to prevent attempted lifting of the door 50 to remove it from the track of the master frame 40 (a typical method of breaking into a dwelling through a patio door), while the lock can furthermore not be forced to an unlocked position due to the forced-entry-resistant configuration of the components of the lock box assembly 101 (FIG. 32). The full lock assembly 100 has been tested on available testing equipment that is capable of applying a 1000 pound maximum load, and the lock assembly 100 withstands such loading.

Since patio doors and other similar doors and windows (e.g., door 50) are very tall, it may be desirable that they are locked at multiple points away from the two points where the lock box assembly 101 may be locked with respect to the first and second lock pins 92*i* and 92*ii* of the keeper 90. As such, the keeper 90 may be formed with additional lock pins. In one embodiment, as may be seen in FIG. 7, the keeper 90 may be formed with a third lock pin 92*iii*, and a fourth lock pin 92*iv*, where each of the third lock pin and fourth lock pin are formed the same as lock pins 92*i* and 92*ii*. Also, as noted above, the full lock assembly 100 may additionally include a first locking bar assembly 103 and a second locking bar assembly 104, which may be similarly formed, and moreover, the first locking bar assembly 103 and the second locking bar assembly 104 may be the exact same subassembly. Therefore, as may be seen in FIG. 6 and FIG. 6A, each locking bar assembly 103/104 may include a bar 191 (or plate, which terms may be used interchangeably herein) that may have an elongated opening formed the same as the elongated opening in each of the first and second locking members 140/150, i.e., the elongated opening in bar 191 having a first opening portion 191Pi with a first width, and a second opening portion 191Pii with a second width, where the first width is greater than said second width. The bar 191 of the first locking bar assembly 103 is secured to the first locking member 140, and the bar 191 of the second locking bar assembly 104 is secured to the second locking member 150. Spacers 192, which may be hollow cylinders, may be secured to each bar 191 of each locking bar assembly to maintain its proper positioning during operation of the full lock assembly 100. The spacers 192 may be secured to the bar 191 using any means of attachment known in the art including, but not limited to, mechanical fasteners (e.g., screws, bolts and nuts, etc.), adhesive, a friction fit, welding techniques, hook and loop fastening materials sold under the trademark VELCRO®, etc. As seen in FIG. 6A, a plate 193 may have a protruding post 194 that may be used for securement of the post to the bar 191. The end of the post 194 may be split and may have an annular lock ring at its distal split end, so that the spacer 192 may be able to snap onto, and be retained upon, the post of the plate 193.

Therefore, with respect to above-described movements of the first locking member 140 and second locking member 150, into the locked and unlocked condition, attachment and use of the locking bar assemblies 103/104 would result in similar movements also causes the corresponding second (narrow) opening portion 191Pii of the bars 191 of each lock bar assembly to align with a third lock pin 92*iii* and fourth lock pin 92*iv* on the keeper 90, so that those two additional narrower openings are trapped between the head portion 92H of the respective pin and the flange of the keeper 90, thereby preventing the patio door from sliding away from the keeper into a door open position at those two additional locations, resulting in locking of the full lock assembly 100 at multiple (e.g., four) separate points, and thus locking of the movement of the door/window across a substantial span of the height of the fenestration product.

Figure 33:
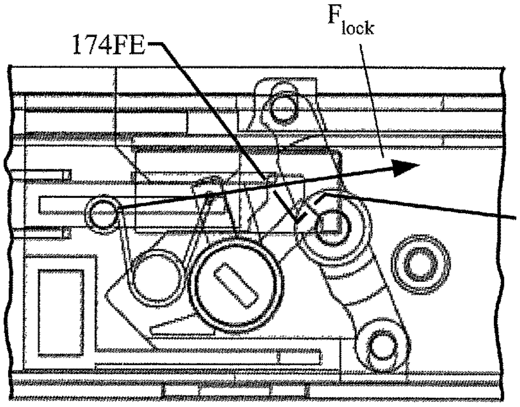
FIG. 33 is an enlarged detail view of a portion of the lock box as seen in FIG. 27.

The lock box assembly 101 may also include a torsion spring 107, which may have a first end that may be formed into a circular loop that may attach to a cylindrical protrusion 124 located a particular position on the housing 120 (see e.g., FIG. 9 and FIG. 28A), and may have a second end be secured with respect to a particular location of the driving member 170, e.g., being secured to hole 175H of the arm 175 of the driving member (see FIG. 14D). Being so configured, the torsion spring 107 may bias the driving member 170 towards the second rotation position (the unlocked condition shown in FIG. 28A) when the driving member is at least at an intermediate rotation position being closer to the the second rotation position than the first rotation position (see the force vector $F_{unlock}$ in FIG. 33), and may also bias the driving member towards the first rotation position (the force vector $F_{lock}$ in FIG. 28) when the driving member is at least at a second intermediate rotation position being closer to the the first rotation position than the second rotation position.

FIG. 40 and FIG. 41 respectively illustrate a side view of an alternate embodiment of the lock assembly shown in FIG. 5, and a front view of an alternate embodiment of the channel section of the keeper assembly shown in FIG. 5, in which the elongated openings are instead formed on the channel section 291 of the keeper, and the lock pins are carried on the lock assembly 200, on the first and second locking members and on the elongated bars of the locking bar assemblies. Operation of the lock box would be the same.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A lock system configured to lock a patio door with respect to a master frame at a plurality of locations, said lock system comprising:

a keeper, said keeper comprising: a first lock pin, and a second lock pin; each of said first and second lock pins formed to include a shaft portion and a head portion; said keeper being secured to said master frame;

a lock assembly, said lock assembly comprising:

a housing, said housing having a main opening on a first side defining an interior surface that forms a housing cavity, and a second opening formed on a central portion of an adjacent side that interconnects with said cavity to form at least a rear wall, a bottom wall, a first side wall, a second side wall, a first upper side wall portion, and a second upper side wall portion; wherein said rear wall comprises: a first flange and a second flange configured to form a track;

a cover member, said cover member configured to enclose said main opening of said housing when said cover is secured to said housing; said cover member comprising: a first flange and a second flange configured to form a track; and wherein said track of said cover member is aligned with said track of said housing when said cover member is secured to said housing;

means for securing said cover member to said housing;

a first locking member; said first locking member comprising:

a flange; said flange comprising: an elongated opening formed with a first portion having a first width configured to permit sliding of said head portion of said first lock pin through said elongated opening, and a second portion with a second width configured to block sliding of said head portion of said first lock pin through said elongated opening;

a protrusion, said protrusion configured to protrude from a first side of said flange, of said first locking member, said protrusion comprising:

a first slider member configured to protrude in a first lateral direction with respect to an axial direction of said flange of said first locking member; and a second slider member configured to protrude in a second lateral direction with respect to the axial direction of said flange of said first locking member;

wherein said first slider member and said second slider member are configured to be slidably received in a first portion of said track in said housing and a first portion of said track in said cover member, respectively;

a first cam following surface;

a second cam following surface;

a second locking member; said second locking member comprising:

a flange comprising: an elongated opening formed with a first portion having a first width configured to permit sliding of said head portion of said second lock pin through said elongated opening of said flange of said second locking member, and a second portion having a second width configured to block sliding of said head portion of said second lock pin through said elongated opening of said flange of said second locking member;

a protrusion configured to protrude from a first side of said flange of said second locking member, and comprising:

a first slider member configured to protrude in a first lateral direction with respect to an axial direction of said flange of said second locking member; and;

a second slider member configured to protrude in a second lateral direction with respect to the axial direction of said flange of said second locking member;

wherein said first and said second slider members of said second locking member are configured to be slidably received in a second portion of said track in said housing and a second portion of said track in said cover member, respectively;

a rocker arm, said rocker arm comprising: a hub, a first arm configured to extend from a first portion of said hub, and a second arm configured to extend from a second portion of said hub;

wherein said hub of said rocker arm is pivotally mounted to said housing;

wherein said first arm is pivotally coupled to said first locking member;

wherein said second arm is pivotally coupled to said second locking member;

a driving member, said driving member being pivotally mounted to said housing and configured to be actuated by a user; said driving member comprising: a cam portion;

wherein when said driving member is rotated from a first rotation position to a second rotation position, said cam portion contacts said first cam following surface to drive said first locking member to slide in a first unlock direction, causing said second locking member to be driven by said rocker arm to slide in a second unlock direction, to cause said first width of said elongated opening of said first locking member to align with said first lock pin and cause said first width of said elongated opening of said second locking member to align with said second lock pin, to unlock said lock system and permit the patio door to slide away from the keeper into a door open position.

2. The lock system according to claim 1, further comprising:

a safety button, said safety button being slidably mounted to said housing to slide between a first button position and a second button position:

a spring, said spring configured to bias said safety button towards said first button position; and wherein said safety button in said first button position is configured to block said first locking member from sliding in the first unlock direction.

3. The lock system according to claim 2, wherein when the patio door is slid into a closed door position, said first lock pin is received through said elongated opening in said first locking member and drives said safety button from said first button position to said second button position; and wherein when said driving member is rotated from the second rotation position to the first rotation position, said cam portion contacts said second cam following surface to drive said first locking member to slide in a first lock direction, causing said second locking member to be driven by said rocker arm to slide in a second lock direction, to cause said seccond width of said elongated opening of said first locking member to engage with said shaft portion of said first lock pin and cause said second width of said elongated opening of said second locking member to engage with said shaft portion of second lock pin, to lock said lock system and inhibit the patio door from sliding away from the keeper into a door open position.

4. The lock system according to claim 3, wherein said keeper further comprises: a third lock pin, and a fourth lock pin, each of said third lock pin and fourth lock pin being formed to include a shaft portion and a head portion;

wherein said lock assembly further comprises:

a first locking bar assembly, said first locking bar assembly comprising: a bar with an elongated opening formed with a first portion having a first width configured to permit sliding of said head portion of said third lock pin through said elongated opening of said bar, and a second width configured to block sliding of said head portion of said third lock pin through said elongated opening of said bar;

wherein said bar of said first locking bar assembly is secured to said first locking member;

a second locking bar assembly, said second locking bar assembly comprising: a plate with an elongated opening formed with a first portion having a first width configured to permit sliding of said head portion of said fourth lock pin through said elongated opening of said plate, and a second width configured to block sliding of said head portion of said fourth lock pin through said elongated opening of said plate;

wherein said plate of said second locking bar assembly is secured to said second locking member; and wherein when said driving member is rotated from the second rotation position to the first rotation position, said cam portion contacts said second cam following surface to drive said first locking member to slide in the first lock direction, causing said second locking member to be driven by said rocker arm to slide in the second lock direction, to cause said second width of said elongated opening of bar of said first locking bar assembly to engage with said shaft portion of said third lock pin and to cause said second width of said elongated opening of said plate of said second locking bar assembly to engage with said shaft portion of fourth lock pin, to lock said lock system at four locations with respect to said keeper and inhibit the patio door from sliding away from the keeper into a door open position.

5. The lock system according to claim 4, wherein said lock assembly further comprises:

a plurality of spacers secured to said bar of said first locking bar assembly; and a plurality of spacers secured to said plate of said second locking bar assembly.

6. The lock system according to claim 5, wherein said track of said housing is positioned between said first upper side wall portion and said second upper side wall portion.

7. The lock system according to claim 6, further comprising:

a torsion spring, a first end of said torsion spring being secured to said housing, and a second end of said torsion spring being secured to said driving member;

wherein said torsion spring is configured to bias said driving member towards the second rotation position when said driving member is at an intermediate rotation position being closer to the the second rotation position than the first rotation position; and wherein said torsion spring is configured to bias said driving member towards the first rotation position when said driving member is at a second intermediate rotation position being closer to the the first rotation position than the second rotation position.

8. A lock assembly configured to lock a patio door with respect to a keeper of a master frame at a plurality of locations, said lock assembly comprising:

a housing, said housing comprising: a rear wall, a bottom wall, a first side wall, and a second side wall; wherein said rear wall comprises: a first flange and a second flange, together being configured to form a track; wherein said housing comprises: an opening;

a cover member, said cover member comprising: a first flange and a second flange together being configured to form a track; and wherein said track of said cover member is aligned with said track of said housing when said cover member is secured to said housing;

means for securing said cover member to said housing;

a first locking member; said first locking member comprising:

a flange; said flange comprising: an elongated opening formed with a first portion having a first width, and a second portion having a second width, said first width being greater than said second width;

a protrusion, said protrusion configured to protrude from a first side of said flange, wherein said protrusion is configured to be slidably received in a first portion of said track in said housing and a first portion of said track in said cover member;

a first cam following surface;

a second cam following surface;

a second locking member, said second locking member comprising:

a flange comprising: an elongated opening formed with a first portion having a first width, and a second portion with a second width; said first width of said elongated opening of said flange of said second locking member being greater than said second width of said elongated opening of said flange of said second locking member;

a protrusion configured to protrude from a first side of said flange of said second locking member;

wherein said protrusion of said flange of said second locking member is configured to be slidably received in a second portion of said track in said housing and a second portion of said track in said cover member;

a rocker arm, said rocker arm comprising: a hub, a first arm configured to extend from a first portion of said hub, and a second arm configured to extend from a second portion of said hub;

wherein said hub of said rocker arm is pivotally mounted to said housing;

wherein said first arm is pivotally coupled to said first locking member;

wherein said second arm is pivotally coupled to said second locking member;

a driving member, said driving member being pivotally mounted to said housing; said driving member comprising: a cam portion;

wherein when said driving member is rotated from a first rotation position to a second rotation position, said cam portion contacts said first cam following surface to drive said first locking member to slide in a first unlock direction, causing said second locking member to be driven by said rocker arm to slide in a second unlock direction, to cause said first width of said elongated opening of said first locking member to align with a first lock pin of the keeper and cause said first width of said elongated opening of said second locking member to align with a second lock pin of the keeper, to unlock said lock system and permit the patio door to slide into a door open position.

* * * * *